United States Patent [19]

Doi et al.

[11] Patent Number: 4,700,971

[45] Date of Patent: Oct. 20, 1987

[54] ADJUSTABLE HYDROPNEUMATIC ACTIVE SUSPENSION APPARATUS

[75] Inventors: Shunichi Doi; Noboru Sugiura; Yasutaka Hayashi; Yuzo Yamamoto, all of Aichi, Japan

[73] Assignee: Kabushiki Kaisha Toyota Chuo Kenkyusho, Aichi, Japan

[21] Appl. No.: 735,972

[22] Filed: May 20, 1985

[30] Foreign Application Priority Data

May 21, 1984 [JP] Japan .................. 59-102234

[51] Int. Cl.⁴ ............................................. B60G 17/06
[52] U.S. Cl. .................................. 280/707; 280/708; 364/424
[58] Field of Search ............... 280/707, 702, 708, 688; 364/424; 180/141

[56] References Cited

U.S. PATENT DOCUMENTS 3,124,368  3/1964  Corley ................................. 280/707
4,589,676  5/1986  Meloche ............................. 280/707

FOREIGN PATENT DOCUMENTS 2736026  2/1978  Fed. Rep. of Germany ...... 280/707
63212    4/1984  Japan .................................. 364/424
796862   1/1981  U.S.S.R. ............................. 364/424
793823   1/1981  U.S.S.R. ............................. 280/707

OTHER PUBLICATIONS

Article from Mar. 1984 issue of "Auto World", written by Alan Baker.

Primary Examiner—John J. Love
Assistant Examiner—Everett G. Diederiks, Jr.

[57] ABSTRACT

An active suspension apparatus detects an absolute acceleration $\ddot{Z}$ in a passenger's compartment of a vehicle and a relative displacement X between an axle and a body, calculates an absolute value $|\ddot{Z}|$ of the absolute acceleration, an absolute value $|X|$ of the relative displacement and an absolute value $|\dot{X}|$ of a rate $\dot{X}$ of change in relative displacement, multiplies the absolute values $|X|$, $|\dot{X}|$, and $|\ddot{Z}|$ with coefficients A11, A12 and A13, and adding the resultant product to obtain a sum $Y = A11|X| + A12|\dot{X}| + A13|\ddot{Z}|$, compares the sum Y with a reference value C for evaluating the predetermined movement of the vehicle, and controls the damping forces of the hydropneumatic springs, thereby improving steering stability and riding comfort.

9 Claims, 26 Drawing Figures

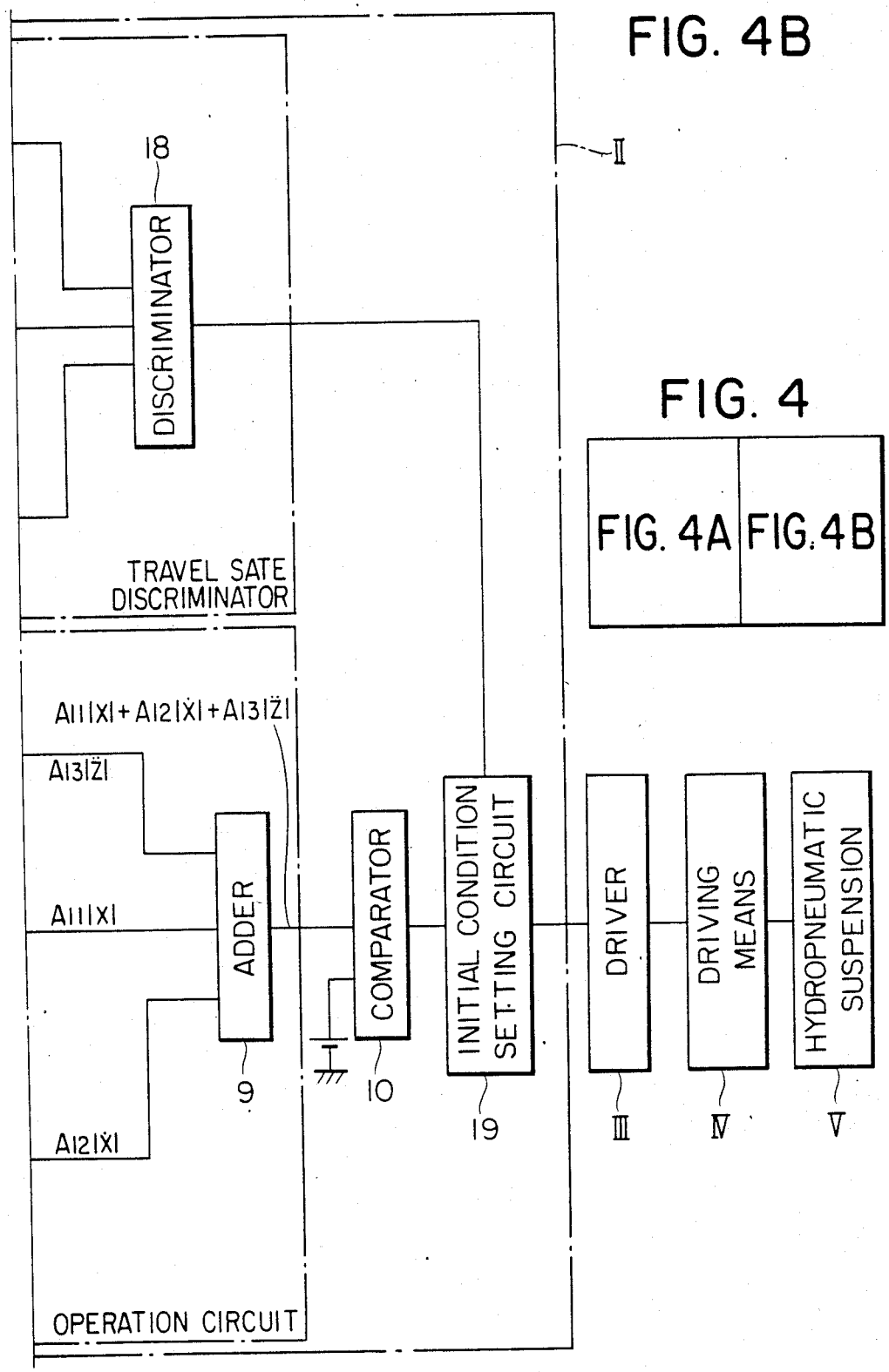

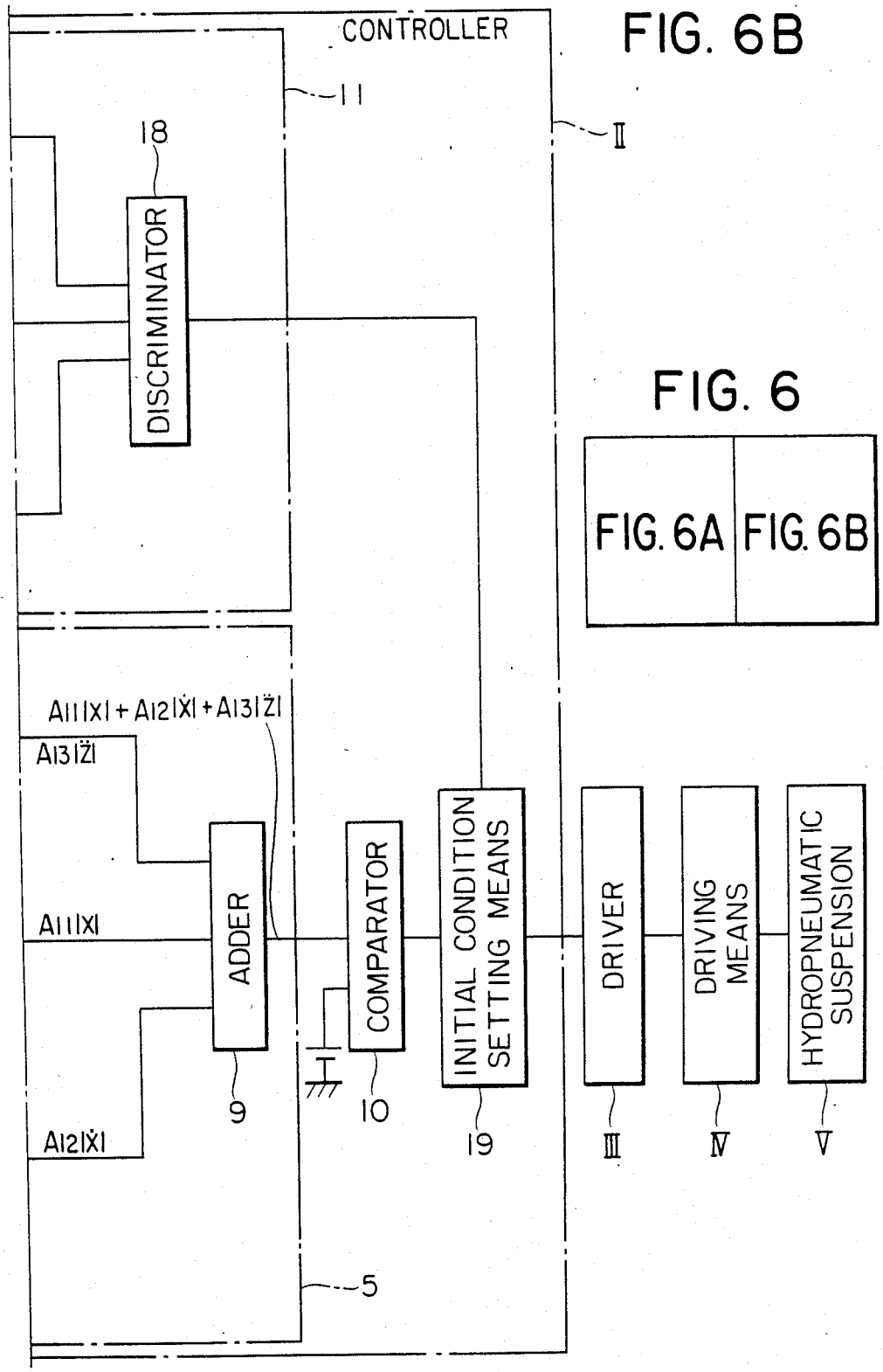

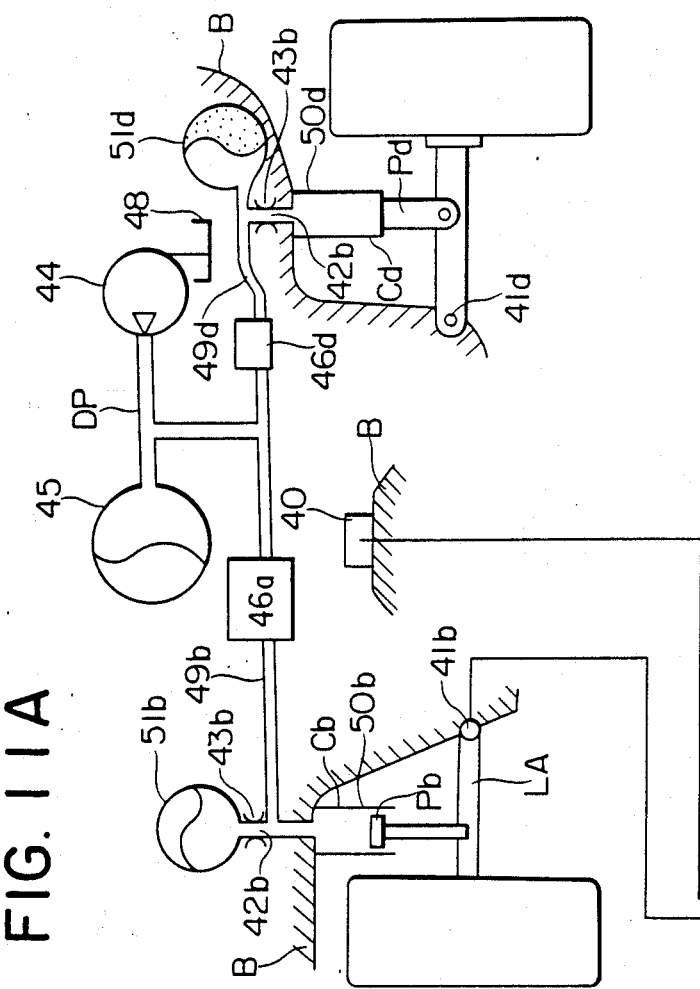
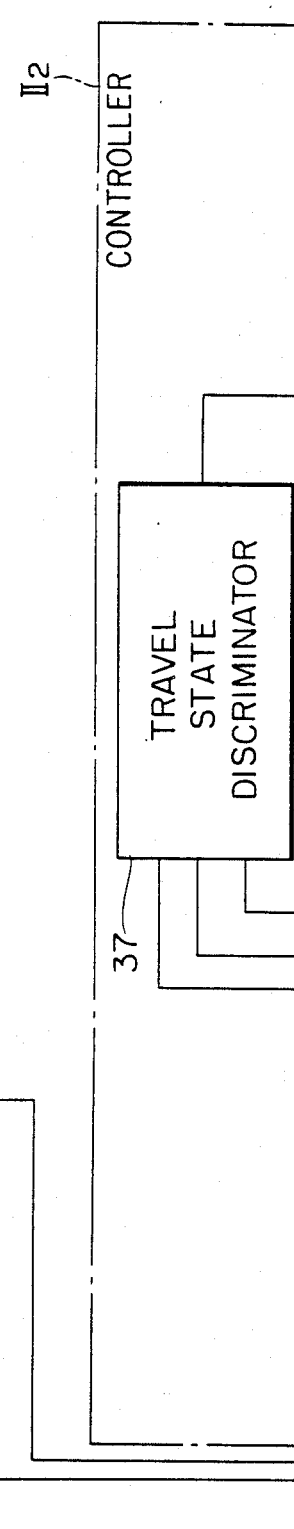
FIG. 11
| FIG. 11A |
|----------|
| FIG. 11B |
FIG. 11A

ADJUSTABLE HYDROPNEUMATIC ACTIVE SUSPENSION APPARATUS

BACKGROUND OF THE INVENTION

I. Field of the Invention

The present invention relates to an active suspension apparatus using hydropneumatic springs for suspending a vehicle body on wheels by utilizing fluid and gas pressures.

II. Description of the Prior Art

In a conventional vehicle suspension damping apparatus wherein shock absorbing/damping force characteristics are variable, a vehicle velocity, a relative displacement of wheels, a relative velocity and an acceleration of a passenger's compartment are used as evaluation functions. The absorbing/damping force characteristics are changed in accordance with the evaluation functions. However, the evaluation functions are determined by specific travel states among various vehicle travel states, and one of motion states and vibrations such as pitch and bounce of the vehicle during starting or braking and rolling during a lane change is controlled on the basis of a single evaluation reference. Therefore, according to the conventional apparatus described above, the control operation is limited to level control or control for a predetermined period of time. As a result, road conditions varying from smooth to rough and vehicle velocities varying from low to high velocity cannot be optimally evaluated, and thus the damping force cannot be optimally controlled.

In the state-of-the-art techniques, a displacement and a velocity of a wheel and the vehicle body relative to each other have been used to evaluate the road surface along which the vehicle travels. In general, the travel state of the vehicle is greatly influenced by road conditions. In particular, when riding comfort and driving stability are to be determined, the travel condition of the vehicle cannot be evaluated since the degree of vibrations at the passenger's position cannot be detected, resulting in inconvenience. Evaluation of the vehicle travel condition is started with absolute acceleration which is closely associated with the driving comfort of driver or passengers. Therefore, an input to the vehicle which is determined by roughness of the road surface as disturbance and actual traveling of the vehicle is evaluated by a relative displacement between the axle and the body and a rate of change in displacement as a function of time. However, decreases in transient vibrations and driving stability at the time when the vehicle travels on a rough road, changes the lane (e.g., the vehicle detours around an obstacle) or rides over a bump cannot be sufficiently detected by the relative displacement and its rate of change described above. The travel state of the vehicle is recognized by the absolute acceleration at the passenger's position in the vehicle compartment, the relative displacement between the axle and the body so as to indicate a degree of input to the vehicle during traveling, and the rate of change in displacement described above must be totally evaluated. The damping forces must be controlled on the basis of such evaluation.

In the conventional apparatus, an acceleration detecting means is arranged at part of the vehicle body to determine the motion and vibrations of the body, thereby detecting the back-and-forth acceleration and deceleration and the vertical acceleration. However, the acceleration detecting means which does not detect the back-and-forth acceleration and which is mounted at a position excluding the passenger's position is subjected to vibrations of the vehicle frame and the constituting components such as auxiliary parts. As a result, vibrations felt by passengers cannot be precisely evaluated, resulting in inconvenience.

SUMMARY OF THE INVENTION

The present invention has been made to resolve the conventional problems described above, and has as its object to provide an active suspension apparatus wherein damping forces of hydropneumatic springs can be optimally controlled irrespective of road conditions and transient traveling changes caused by unevenness, bumps or the like of a road in accordance with evaluations of road surface conditions and travel conditions as influenced by vehicle velocity or the like, thereby improving comfort and driving stability.

In order to achieve the above object of the present invention, there is provided an active suspension apparatus, comprising: acceleration detecting means for detecting an absolute acceleration $\ddot{Z}$ of a passenger's compartment in which a passenger rides; displacement detecting means for detecting a relative displacement X between an axle and a vehicle body; a controller for discriminating a road surface state and a travel state in accordance with signals from the acceleration detecting means and the displacement detecting means, and driving means for controlling an opening of a restrictor arranged between each hydropneumatic spring chamber and an actuator in accordance with a signal from the controller which represents the road surface state and the travel state, whereby damping force characteristics are controlled in accordance with the road surface state and the travel state. The controller comprises: a differentiator for differentiating the relative displacement X detected by the displacement detecting means and generating a rate $\dot{X}$ of change in relative displacement as a function of time; an absolute value circuit for calculating absolute values of the relative displacement X, the rate $\dot{X}$ and an absolute acceleration $\ddot{Z}$; an operation circuit for multiplying signals representing absolute values $|X|$, $|\dot{X}|$ and $|\ddot{Z}|$ from the absolute value circuit with predetermined coefficients A11, A12 and A13; and a comparator for comparing a signal $A11|X|+A12|\dot{X}|+A13|\ddot{Z}|$ with a reference value C and generating a signal representing the road surface state and the travel state such as a vehicle velocity. The active suspension apparatus of the present invention further comprises driving means for controlling the opening of a restriction valve arranged between each hydropneumatic spring chamber and the actuator in accordance with the road surface signal and the travel state signal which are generated from the controller.

According to the active suspension apparatus of the present invention, a value $A11|X|$ obtained by multiplying the absolute value $|X|$ of the relative displacement X with the coefficient A11, a value $A12|\dot{X}|$ obtained by multiplying the absolute value $|\dot{X}|$ of the rate $\dot{X}$ of change in relative displacement as a function of time with the coefficient A12 and a value $A13|\ddot{Z}|$ obtained by multiplying the absolute value $|\ddot{Z}|$ of the absolute acceleration $\ddot{Z}$ with the coefficient A13 are added to derive a sum $Y = A11|X| + A12|\dot{X}| + A13|\ddot{Z}|$. The controller then discriminates whether or not the sum Y exceeds the reference value C representing a triangular region in a graph corresponding to the road surface state and the travel state. When the controller determines that the sum Y exceeds the reference value C, i.e., when the controller determines that the vehicle travels along a rough road, the driving means is controlled to produce large damping forces from the hydropneumatic springs. However, when the controller determines that the sum Y does not exceed the reference value C, i.e., when the controller determines that the vehicle travels along a normal or smooth road, the springs are controlled to produce low damping forces. In this manner, by controlling the damping forces of the hydropneumatic springs, vibrations are absorbed by large damping forces when the vehicle travels along a rough road. However, when the vehicle travels along a normal or smooth road, low damping forces are generated to provide good riding comfort to the passengers.

According to one aspect of the present invention, the controller comprises: an average value circuit for average values $Y|X|$, $Y|\dot{X}|$ and $Y|\ddot{Z}|$ of the absolute value $|X|$ of the relative displacement X, the absolute value $|\dot{X}|$ of the rate $\dot{X}$ of change within a predetermined period of time and the absolute value $|\ddot{Z}|$ of the absolute acceleration $\ddot{Z}$; a comparator for comparing the average value outputs from the absolute value circuit with reference values preset for classifying the road surface and travel states and generating comparison outputs; a discriminator for discriminating cases wherein all the average value outputs are larger and smaller than the reference values; and an initial value setting circuit for setting an initial opening of the restrictor in accordance with the signal generated from the discriminator. When all the outputs from the comparators are larger than the corresponding reference values, the discriminator generates a signal representing a rough road or high-speed traveling. However, when all the outputs are smaller than the corresponding reference values, the discriminator generates a signal representing a normal or smooth road or low-speed traveling. In the former case, the initial condition setting circuit controls the restrictor arranged between each hydropneumatic spring chamber and the actuator to increase the damping force. However, in the latter case, the initial condition setting circuit controls the restrictor to decrease the damping force. According to this aspect of the present invention, the damping forces of the hydropneumatic springs are controlled in accordance with the discrimination results described above. Therefore, when the vehicle travels along a normal or smooth road, the damping force is decreased to guarantee soft riding. However, when the vehicle travels along a rough road, the damping force is increased to guarantee driving stability. In addition, when disturbance acts on the vehicle while the vehicle is steadily traveling, the damping forces of the hydropneumatic springs can be changed to optimize the riding comfort in all travel conditions, resulting in convenience.

According to a second aspect of the present invention, the operation circuit comprises a coefficient operation circuit for nonlinearly changing coefficients, to be multiplied with the outputs from the absolute value circuit, in accordance with magnitudes of the outputs from the absolute value circuit. In the active suspension apparatus according to the second aspect of the present invention, nonlinear optimal coefficients can be calculated by the coefficient operation circuit to change the damping forces of the hydropneumatic springs when the vehicle rides over a transient step or bump. Therefore, riding comfort and driving stability can be improved.

DETAILED DESCRIPTION OF THE PREFERRED EMBODIMENTS

The present inventors made extensive and systematic studies of how riding comfort of a passenger as a subjective evaluator thereof is evaluated by vehicle behavior in accordance with all travel conditions. The present inventors found that vibration acceleration at the vehicle floor on which passengers ride was mostly associated with riding comfort. The present inventors further examined the relationship between the road surface state closely associated with the travel state and the vehicle body state and found that the relative displacement between the axle and the vehicle body and the rate of change therein were suitable for evaluating the degree of input to the vehicle. In order to control vibration of the body at the floor thereof, the present inventors found that the vibration acceleration $\ddot{Z}$ at the passenger's position in the passenger's compartment, the relative displacement X between the axle and the body which determines the relationship between the actual road surface and the floor, and the rate of change $\dot{X}$ in relative displacement were indispensable factors, thereby achieving the present invention.

Figure 2:
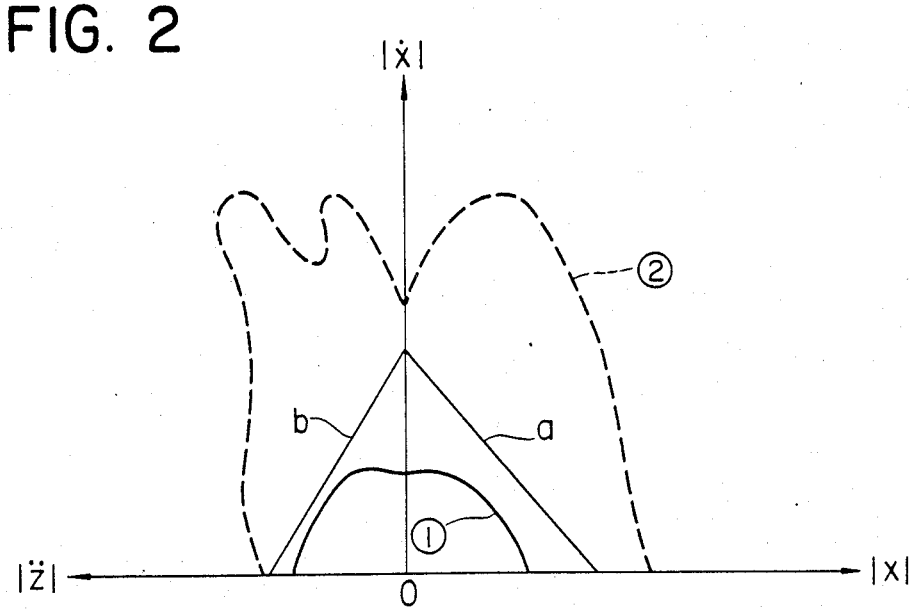
FIG. 2 is a graph showing road surface states each represented by an absolute value $|X|$ of a relative displacement, an absolute value $|\dot{X}|$ of the rate of change therein and an absolute value $|\ddot{Z}|$ of the absolute acceleration.

The present inventors further examined the relationship between the parameters (i.e., the relative displacement X, the rate $\dot{X}$ of change therein and the absolute acceleration $\ddot{Z}$) and the states (i.e., the road surface and travel states) when the vehicle was driven along different road surfaces under different travel conditions. As a result, the present inventors found that the relative displacement X and the rate $\dot{X}$ of change therein were increased on a rough road. The present inventors also found that the absolute acceleration $\ddot{Z}$ of the sprung mass, i.e., the vehicle body, was also increased to increase vibrations and degrade riding comfort, and, often, degrade driving stability. It was also found that when the absolute acceleration $\ddot{Z}$ was large although the displacement X and the rate $\dot{X}$ were not independently large, the passengers felt vibrations. More particularly, when the sum of the absolute values (i.e., $|X|+|\dot{X}|+|\ddot{Z}|$) of the displacement X, the rate $\dot{X}$ of change and the acceleration $\ddot{Z}$ exceeded a predetermined value, riding comfort and other feelings were influenced. As shown in FIG. 2, when an $|X|-|\dot{X}|-|\ddot{Z}|$ coordinate system is considered wherein the absolute value $|X|$ of the relative displacement is plotted along the right direction of the abscissa, the absolute value $|\dot{X}|$ of the relative velocity, i.e., the rate of change in relative displacement is plotted along the upper direction of the ordinate, and the absolute value $|\ddot{Z}|$ of the absolute acceleration is plotted along the left direction of the abscissa, a position on the coordinate system represents a vehicle travel state. When the vehicle travels along a paved normal road, the travel state falls within the region bounded by the solid curve ①. When the vehicle travels along a paved rough road, the travel state falls outside the region bounded by the broken curve ②. In this manner, the points belong to different regions in accordance with the vehicle travel states, thereby discriminating an actual vehicle travel state.

Based on the above assumption, the present inventors performed an experiment wherein the absolute values $|X|$, $|\dot{X}|$ and $|\ddot{Z}|$ of the displacement X and its rate $\dot{X}$ of change and the absolute acceleration $\ddot{Z}$ were compared to detect the road surface and vehicle travel states, and the damping forces of the hydropneumatic springs were controlled in accordance with the detected values. The present inventors found that the influence of the displacement X on riding comfort and other feelings was different from that of the rate $\dot{X}$ of change and the absolute acceleration $\ddot{Z}$ thereon. In addition, when a predetermined ratio of the former influence to the latter influence was established, the correspondence between riding comfort and other feelings with a given vehicle travel condition was found to be improved. More particularly, the coefficients in the relation $A11|X|+A12|\dot{X}|+A13|\ddot{Z}|$ are given in a predetermined ratio in a given travel state determined by the road surface state and factors such as vehicle velocity. When the sum obtained was larger than the predetermined reference value, it was found that valves could be opened to improve riding comfort and other feelings.

According to the present invention, the different travel conditions in FIG. 2 are recognized, and the damping forces of the hydropneumatic springs are changed in accordance with the case wherein the travel state falls within the triangular region surrounded by the $|X|$-axis, the $|\ddot{Z}|$-axis and a line a in the $|X|-|\dot{X}|-|\ddot{Z}|$ coordinate system and the case wherein the travel state falls outside the triangular region, thereby improving riding comfort. This region was experimentally determined by the present inventors in the following manner. The triangular region corresponds to a range having the absolute value $|\ddot{Z}|$ of the absolute acceleration, the absolute value $|X|$ of the relative displacement, and the absolute value $|\dot{X}|$ of the rate of change in relative displacement when the vehicle travels along a normal and smooth road. When the travel state falls outside the triangular region, the absolute value $|\ddot{Z}|$ of the absolute acceleration, the absolute value $|X|$ of the relative displacement and the absolute value $|\dot{X}|$ of the rate of change in relative displacement fall within the range at the time when the vehicle travels along a rough road. The above relationship is given in mathematical expression (1).

An evaluation value Y of relative motion at a given time is derived in accordance with the absolute value $|\ddot{Z}|$ of the absolute acceleration $\ddot{Z}$ of the compartment, the absolute value $|X|$ of the relative displacement between the axle and the body, and the rate $|\dot{X}|$ of change in relative displacement as a function of time in the following manner.

$$Y = A11|X| + A12|\dot{X}| + A13|\ddot{Z}| \qquad (1)$$

Lines a and b given by equation (1) are plotted in FIG. 2. When a motion evaluation reference value is given as C, the evaluation value Y is compared with the reference value C so as to determine whether the vehicle travels along a smooth or a rough road. The damping force of the hydropneumatic spring is controlled in accordance with the determined result, thereby optimizing the travel state of the vehicle.

Figure 3:
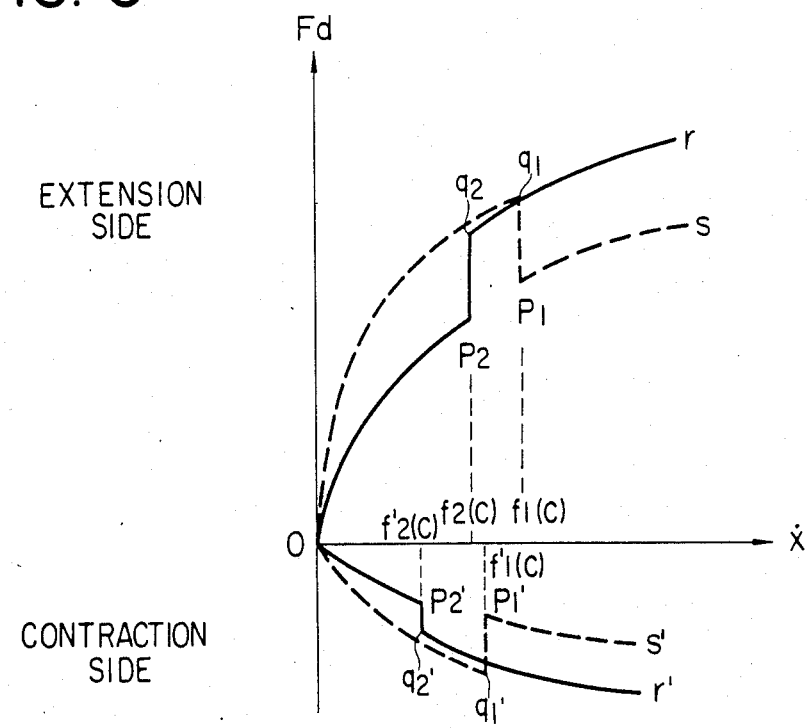
FIG. 3 is a graph showing switching states of damping forces of the hydropneumatic spring.

FIG. 3 shows a case wherein the damping forces are switched between high and low damping forces in accordance with the discrimination results. The relative velocity $\dot{X}$ is plotted along the abscissa and the damping force Fd is plotted along the ordinate. By using the evaluation value Y and the reference value C which are given by equation (1) for determining the triangular region of FIG. 2, the relative velocity for switching the damping forces is determined. The switching relative velocity is given by f1(C), f2(C), f1'(C) and f2'(C).

When the vehicle travels along a rough road, i.e., when the travel state falls outside the triangular region, large damping forces given by curves q2r or q2'r are given to effectively absorb the vibrations. However, when the vehicle travels along a normal or smooth road, i.e., when the travel state falls within the triangular region, a small damping force is given in accordance with curve op2 or op2', thereby preventing an adverse effect on riding comfort.

Figure 1B:
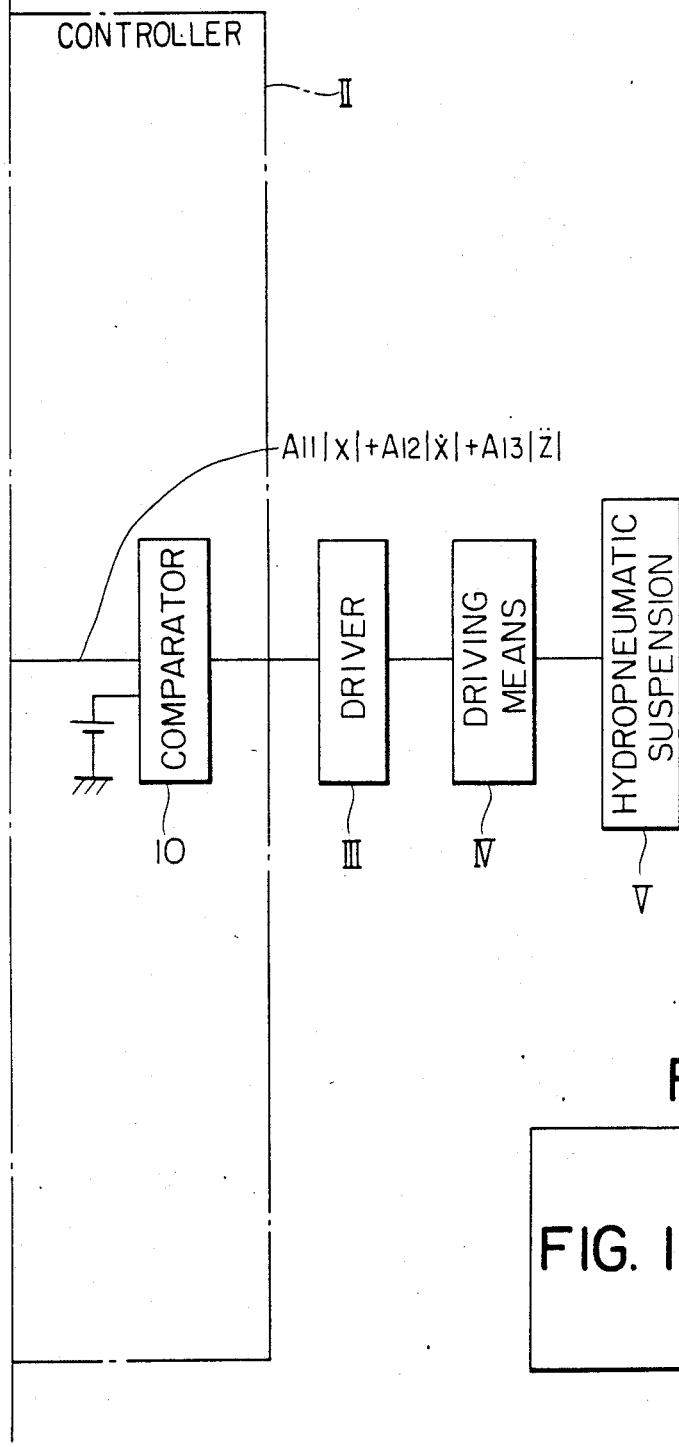
FIG. 1, composed of FIGS. 1A and 1B arranged as shown in FIG. 1, is a block diagram showing a basic configuration of an active suspension apparatus of the present invention.
Figure 1:
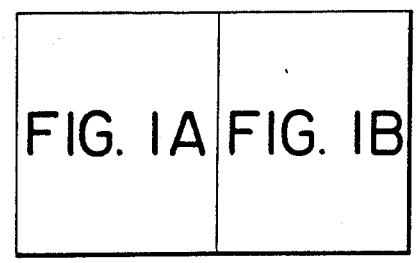
Figure 1A:
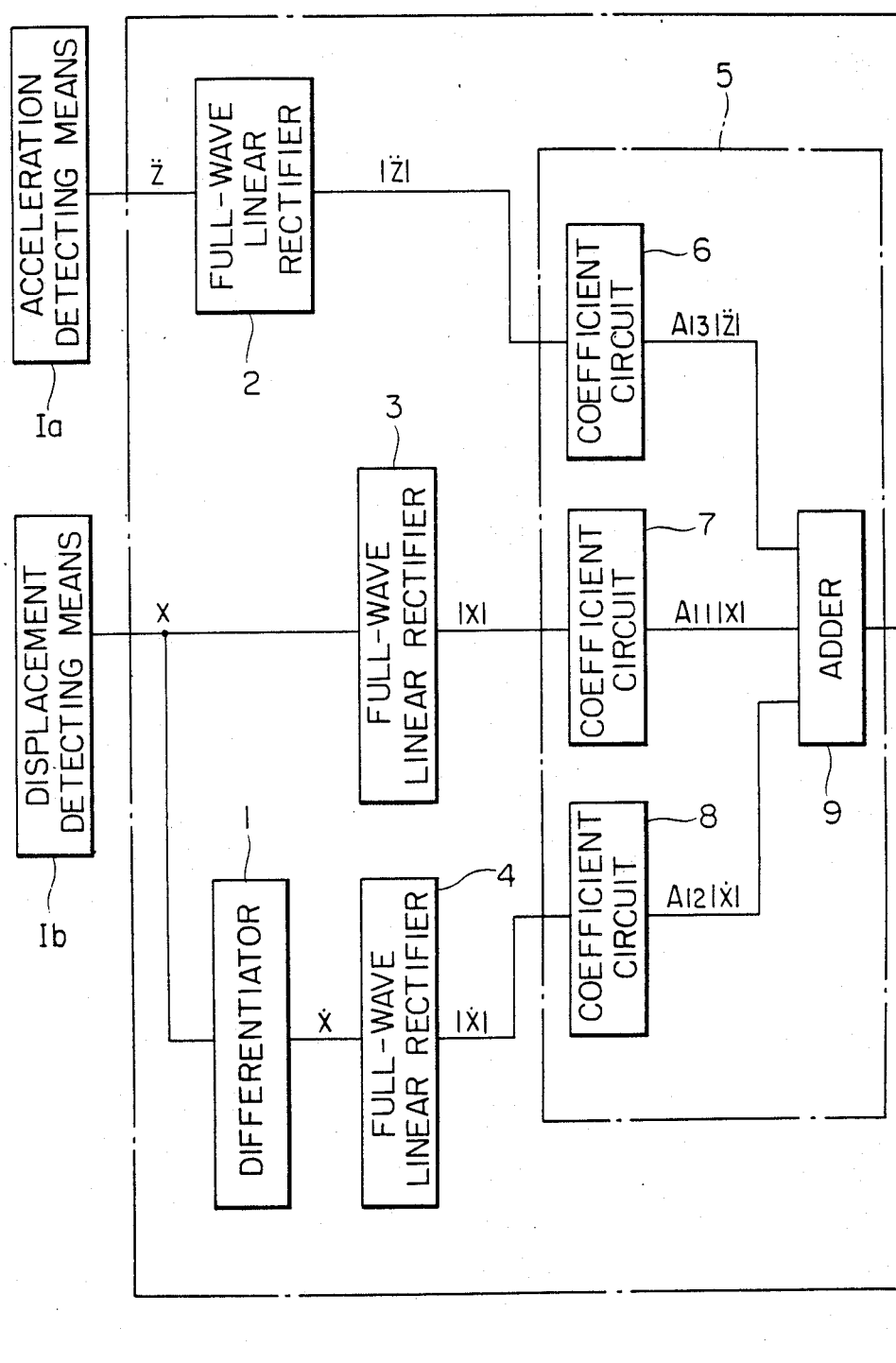

FIG. 1 is a block diagram showing the basic configuration of the active suspension apparatus of the present invention.

A controller II comrises: a rectifier 2 serving as an absolute value circuit for linearly detecting a full wave of the absolute acceleration $\ddot{Z}$ detected by an acceleration detecting means Ia and for calculating the absolute value $|\ddot{Z}|$; a differentiator 1 for differentiating the relative displacement X detected by a displacement detecting means Ib and generating a rate $\dot{X}$ of change in relative displacement as a function of time; a rectifier 3 for detecting a full wave of the relative displacement X and generating an absolute value $|X|$ thereof; a rectifier 4 serving as an absolute value circuit for linearly detecting a full wave of the rate $\dot{X}$ of change generated from the differentiator 1 and for generating the absolute value $|\dot{X}|$ thereof; an operation circuit 5 for multiplying the signals generated from the rectifiers a to 4 with predetermined coefficients and adding the products; and a comparator 10 for comparing the signal $(A11|X| + A12|\dot{X}| + A13|\ddot{X}|)$ from the operation circuit 5 with the reference value for determining the triangle region and for generating a signal representing the road surface and travel states. The operation circuit 5 comprises coefficient circuits 6 to 8 and and adder 9.

The comparator 10 in the controller II generates a signal to a driver III when the absolute value $|\ddot{Z}|$ of the absolute acceleration, the absolute value $|X|$ of the relative displacement and the rate $|\dot{X}|$ of change in relative displacement fall outside the triangular region. The driver III amplifies the signal generated from the comparator 10, and an amplified signal is supplied to a driving means IV. The driving means IV controls the opening of the restrictor arranged between each hydropneumatic spring chamber and an actuator.

As is apparent from the above description, in the active suspension apparatus of the present invention, the value $A11|X|$ obtained by multiplying the absolute value $|X|$ of the relative displacement X with the coefficient value A11, the value $A12|\dot{X}|$ obtained by multiplying the absolute value $|\dot{X}|$ of the rate X of change in relative displacement and the value $A13|\ddot{Z}|$ obtained by multiplying the absolute value $|\ddot{Z}|$ of the absolute acceleration Z with the coefficient A13 are added to obtain a sum $Y = A11|X| + A12|\dot{X}| + A13|\ddot{Z}|$. The controller then checks whether or not the sum Y exceeds the reference value C determining the triangular region corresponding to the road surface state and the travel state. When the controller determines that the sum Y exceeds the reference value C, i.e., when the controller determines that the vehicle travels along a rough road, the driving means is actuated to control the restrictor to produce a large damping force. However, when the sum Y does not exceed the reference value C, i.e., when the controller determines that the vehicle travels along a smooth road, a low damping force is generated.

In the vehicle moving relative to the road surface, the damping force characteristics of the hydropneumatic springs are controlled in accordance with the sum of the state evaluation values of the relative displacement, the relative velocity and the absolute acceleration at the optimal passenger's position so as to evaluate riding comfort during traveling. Therefore, when the vehicle travels along a rough road, the damping force is increased to effectively absorb the vibrations. However, when the vehicle travels along a normal or smooth road, a low damping force is generated so as not to impair riding comfort.

The following aspects of the present invention will be described before its preferred embodiments are described.

According to the first aspect of the present invention, the controller comprises: an average value circuit for calculating average values $Y|X|$, $Y|\dot{X}|$ and $Y|\ddot{Z}|$ of the absolute value $|\ddot{Z}|$ of the absolute acceleration Z, the absolute value $|X|$ of the relative displacement X and the absolute value $|\dot{X}|$ of the rate $\dot{X}$ of change within a predetermined period of time; a comparator for comparing the average value outputs from the absolute value circuit with reference values preset for classifying the road surface and travel states and generating comparison outputs; a discriminator for discriminating cases wherein all the average value outputs are larger and smaller than the reference values; and an initial value setting circuit for setting an initial opening of the restrictor in accordance with the signal generated from the discriminator. When all the outputs from the comparators are larger than the corresponding reference values, the discriminator generates a signal representing a rough road or high-speed traveling. However, when all the outputs are smaller than the corresponding reference values, the discriminator generates a signal representing a normal or smooth road and low-speed traveling. In the former case, the initial condition setting circuit controls the restrictor arranged between each hydropneumatic spring chamber and the actuator to increase the damping force. However, in the latter case, the initial condition setting circuit controls the restrictor to decrease the damping force.

Figure 4A:
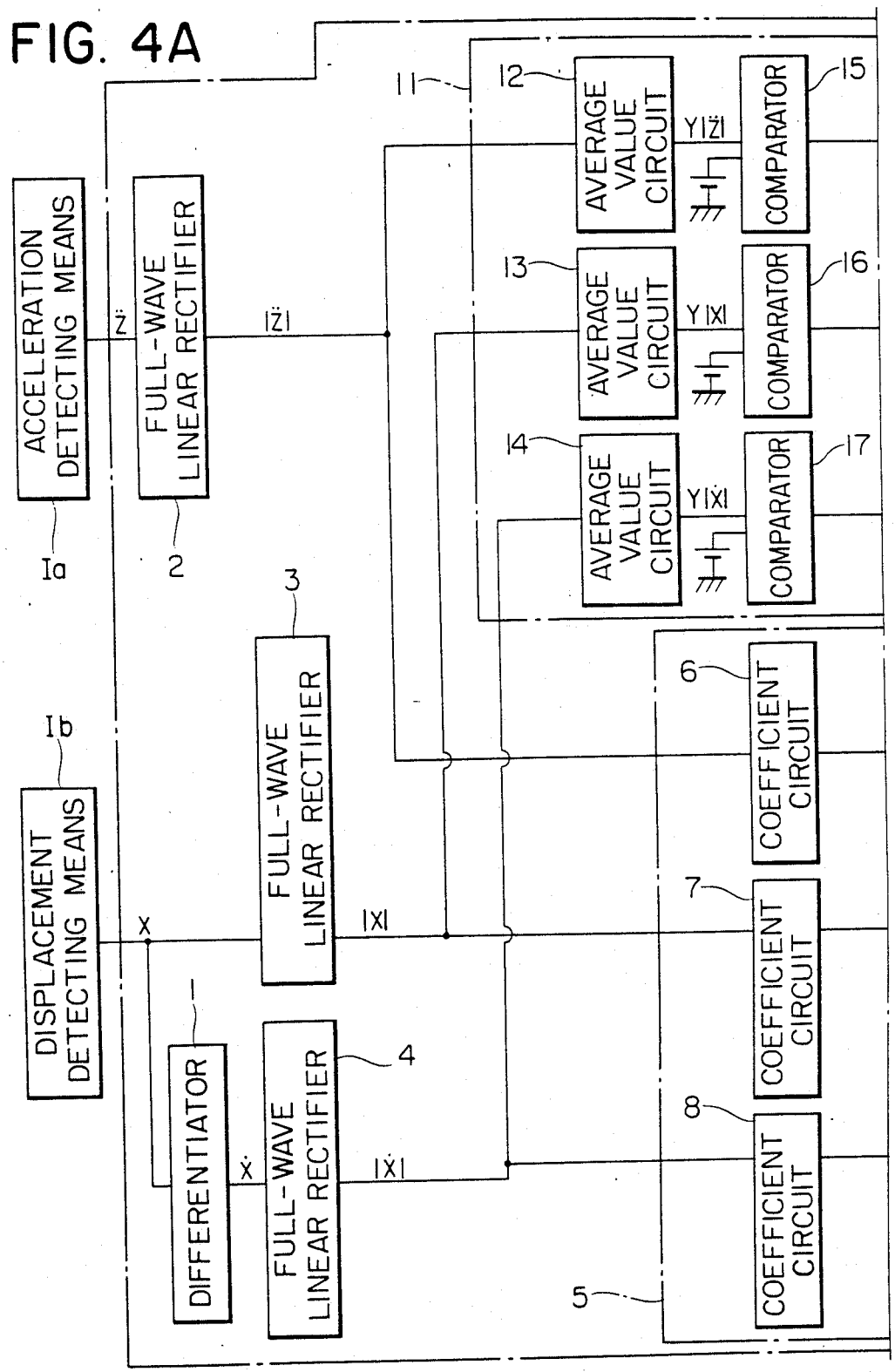
FIG. 4, composed of FIGS. 4A and 4B arranged as shown in FIG. 4, is a block diagram showing the basic configuration of an active suspension apparatus according to a first aspect of the present invention.

FIG. 4 is a block diagram showing the basic configuration of the first aspect of the present invention. The controller II of the first aspect comprises a travel state discriminator 11 which has: average value circuits 12 to 14 for averaging the outputs from the full-wave linear rectifiers 2 to 4 for a predetermined period of time; second to fourth comparators 15 to 17 for comparing the average value $Y|\ddot{Z}|$ of the absolute value $|\ddot{Z}|$ of the absolute acceleration Z, the average value $Y|X|$ of the absolute value $|X|$ of the relative displacement and the absolute value $Y|\dot{X}|$ of the absolute value $|\dot{X}|$ of the rate $\dot{X}$ of change in relative displacement with the corresponding reference values and for generating comparison signals; and a discriminator for discriminating a travel state in accordance with the output signals from the second to fourth comparators 15 to 17. The controller II also comprises an initial condition setting circuit 19 for setting an initial condition of the restrictor opening in response to the output from the travel state discriminator 11 and the output from the comparator 10 and for supplying a signal to the driver III.

The principle of control of the first aspect will be described with reference to FIG. 5.

Figure 5:
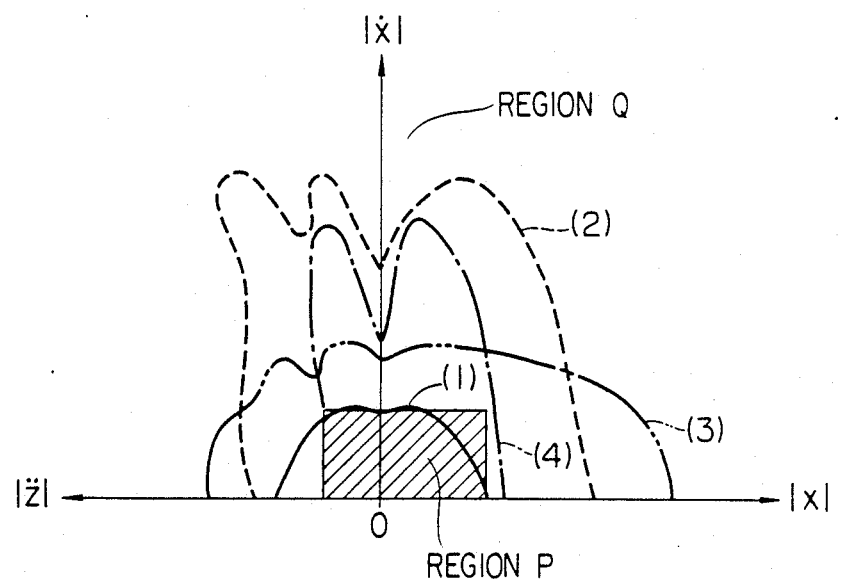
FIG. 5 is a graph showing the same relationship as in FIG. 2 so as to explain the principle of control of the first aspect.

FIG. 5 shows a classification of the vehicle travel states plotted along the $|X| - |\dot{X}| - |\ddot{Z}|$ coordinate system in the same manner as in FIG. 1. The values of the signals are obtained when (1) the vehicle travels along a smooth road, (2) the vehicle travels along a rough road, (3) the vehicle rides over ups and downs of a rough road or changes lanes (e.g., the vehicle detours around an obstacle) and (4) the vehicle rides over a bump. The cases (1) and (2) are the same as in FIG. 2. When the travel state comprises components plotted at the lower region (i.e., the region P in FIG. 5) even if the vehicle travels on a smooth or a rough road or rides over ups and downs, the damping force of the hydropneumatic spring is kept low. In this case, an adverse influence does not act on riding comfort. Therefore, according to the first aspect, the different travel states in FIG. 1 are recognized and the specific region P is set. When a given travel state falls within the specific region P, or falls outside the region P (i.e., the region Q), the damping forces of the hydropneumatic springs are switched, thereby improving riding comfort against vibrations. The effect obtained by switching was experimentally confirmed by the present inventors.

The region P in FIG. 5 indicates that riding comfort is not impaired even if the damping force of the hydropneumatic spring is low in every travel state. In a region (i.e., the region Q) excluding the region P, the damping force of the hydropneumatic spring must be kept high.

The above operations can be expressed by equations (2) to (4). The travel state can be represented by the relative displacement X, the relative velocity $\dot{X}$ and the absolute velocity $\dot{Z}$ at a given time.

$$Y|X| = \int_0^T |X| dt/T \tag{2}$$

$$Y|\dot{X}| = \int_0^T |\dot{X}| dt/T \tag{3}$$

$$Y|\ddot{Z}| = \int_0^T |\ddot{Z}| dt/T \tag{4}$$

where T is the predetermined time interval corresponding to a time constant in calculation. Equations (2) to (4) represent average values of integrals representing three states of the absolute value $|X|$ of the relative displacement X, the absolute value $|\dot{X}|$ of the rate $\dot{X}$ of change in relative displacement X, and the absolute value $|\ddot{Z}|$ of the absolute acceleration $\ddot{Z}$, respectively. The average values $Y|X|$, $Y|\dot{X}|$ and $Y|\ddot{Z}|$ can be plotted along the three-axis coordinate system, thereby distinguishing the distributionn regions of these average values.

The specific region P of the road surface state and the travel state which are instantaneously changed is defined by the average values $Y|X|$, $Y|\dot{X}|$ and $Y|\ddot{Z}|$ and their reference values $\alpha 0$, $\beta 0$ and $\gamma 0$ as follows:

Region P:

$$Y|X| \leq \alpha 0, Y|\dot{X}| \leq \beta 0, Y|\ddot{Z}| \leq \gamma 0 \tag{5}$$

The initial value of the opening of the restrictor for determining the damping force characteristics of the hydropneumatic springs is determined. The controller then checks whether or not the travel state falls within the region P. Subsequently, discrimination is performed by equation (1). Finally, by combining these discrimination results, the damping force characteristics of the hydropneumatic springs are controlled, thereby optimizing the travel state of the vehicle. More particularly, when the vehicle travels along a smooth or normal road, riding comfort is improved with a small damping force of the hydropneumatic springs. However, when the vehicle travels along a rough road, the hydropneumatic springs preferably produce large damping forces to improve driving stability. Furthermore, when the vehicle rides over a bump or rapidly changes lanes and thus the absolute value $|\ddot{Z}|$ of the absolute acceleration $\ddot{Z}$, the absolute value $|\dot{X}|$ of the relative velocity $\dot{X}$ and the absolute value $|X|$ of the relative displacement X are rapidly changed, the damping forces of the hydropneumatic springs are switched in correspondence with the change in travel state on the basis determined by the evaluation value Y (given by equation (1)) of the travel state and the reference value C.

In the active suspension apparatus according to the first aspect of the present invention, as described above, the different travel states are recognized. The controller then checks whether or not the travel state falls within the region P, i.e., the range of the average values $Y|X|$, $Y|\dot{X}|$ and $Y|\ddot{Z}|$ of the absolute values of the relative displacement X, its rate $\dot{X}$ of change and the absolute acceleration $\ddot{Z}$ at the time when the vehicle travels along a smooth or normal road. The opening of the restrictor of the hydropneumatic spring is set in the initial value, thereby optimizing the travel state of the vehicle.

According to condition (5) of the first aspect, as shown in FIG. 5, the reference values $\alpha 0$, $\beta 0$ and $\gamma 0$ for evaluating the travel state are compared with the average values $Y|X|$, $Y|\dot{X}|$ and $Y|\ddot{Z}|$ to determine whether the vehicle travels at a low velocity along a smooth or normal road or not. Based on this discrimination result and the result given by equation (1), the damping forces of the hydropneumatic springs are controlled. When the vehicle travels along a smooth or normal road, the damping force is decreased to guarantee soft riding. However, when the vehicle travels along a rough road, the damping force is increased to improve driving stability. Furthermore, when disturbance acts on the vehicle which is being steadily driven, the damping force characteristics of the hydropneumatic springs are changed to optimize riding comfort in every travel state, thus resulting in convenience.

According to a second aspect of the present invention, a nonlinear coefficient setting circuit is provided wherein the predetermined coefficients in the operation circuit 5 for multiplying the components $|\ddot{Z}|$, $|X|$ and $|\dot{X}|$ detected by the three rectifiers 2 to 4 are modified therewith by outputs from the rectifiers 2 to 4.

Figure 6A:
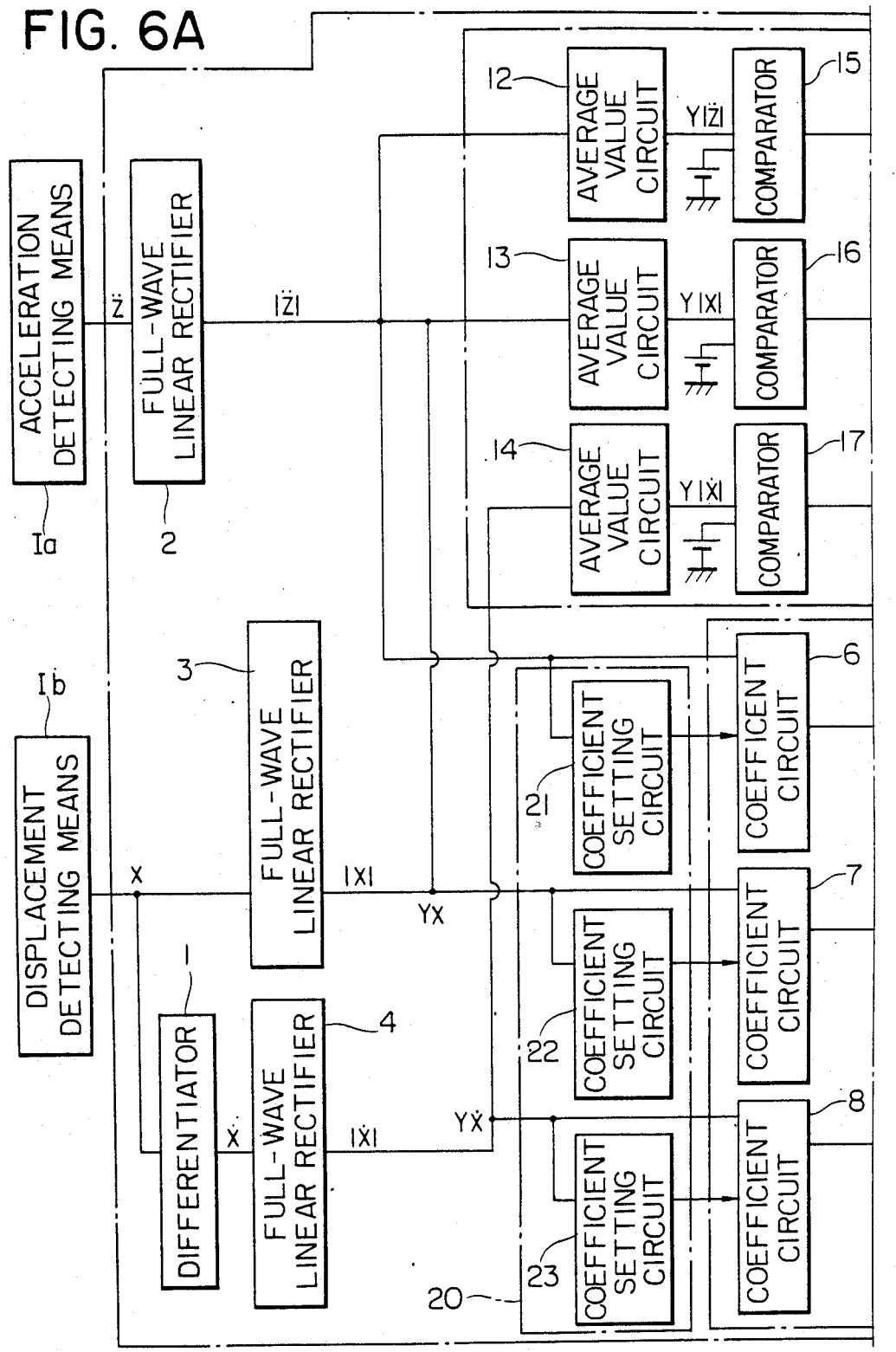
FIG. 6, composed of FIGS. 6A and 6B arranged as shown in FIG. 6, is a block diagram showing the basic configuration of an active suspension apparatus according to a second aspect of the present invention.

FIG. 6 is a block diagram showing the basic configuration of the second aspect of the present invention. A controller II of the second aspect is obtained by arranging three independent coefficient setting circuits in the controller II of the first embodiment. More particularly, the output signals from three full-wave linear rectifiers 2 to 4 are supplied to three coefficient setting circuits 21 to 33 for calculating the coefficients using as variables the output signals from the three full-wave linear rectifiers 2 to 4. The output terminals of the coefficient setting circuits 21 to 23 are respectively connected to coefficient circuits 6 to 8.

Figure 7:
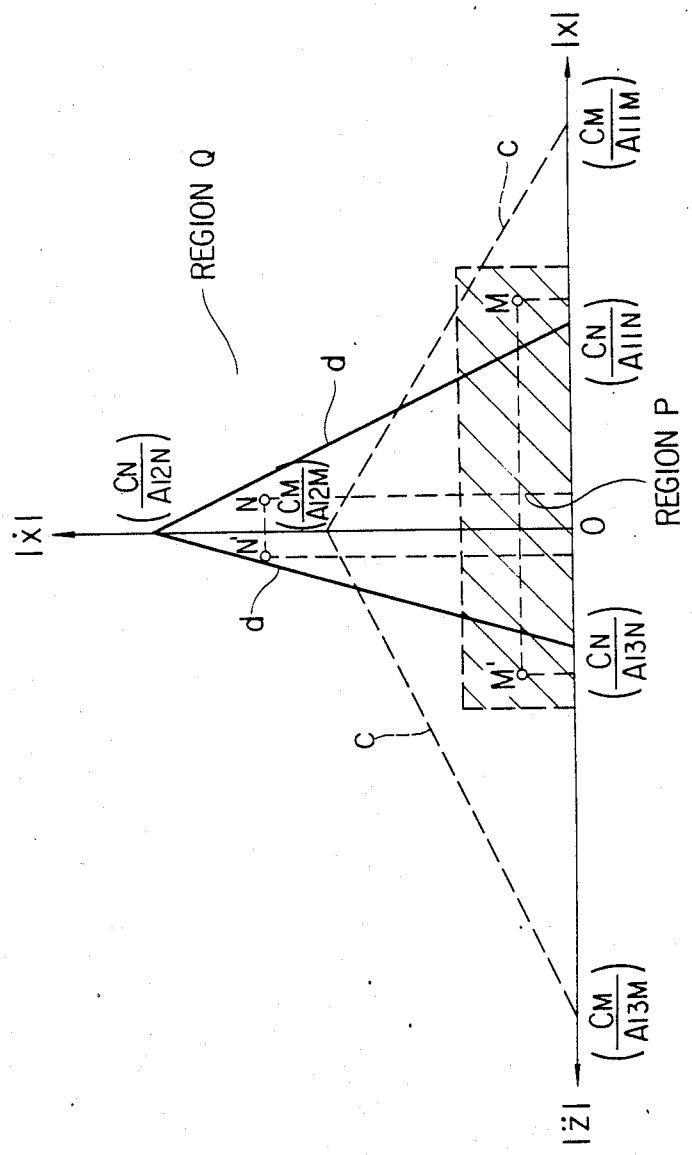
FIG. 7 is a graph showing the same relationship as in FIG. 5 so as to explain the principle of control of the second aspect.
Figure 8:
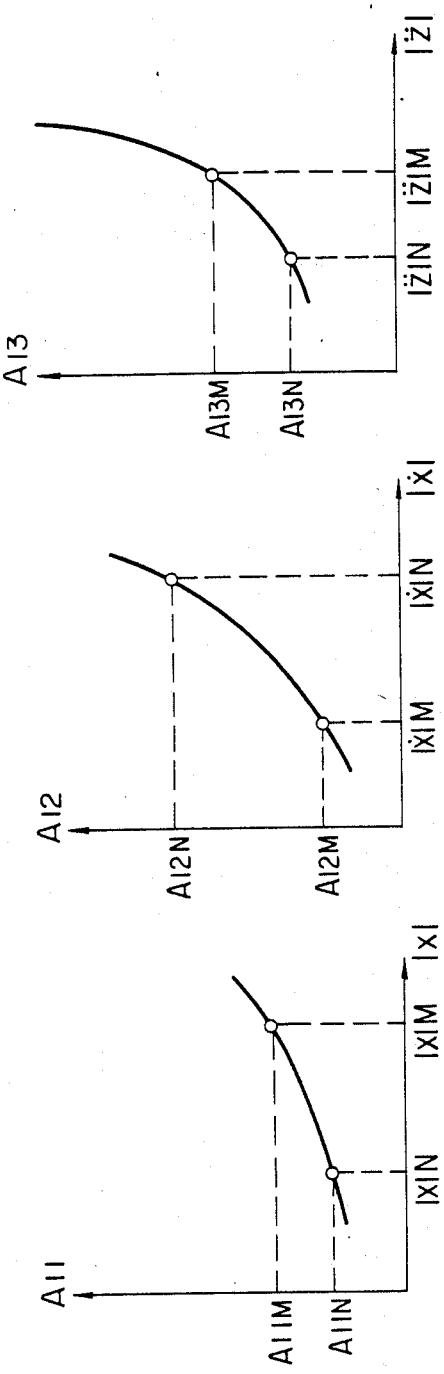
FIGS. 8A to 8C are graphs showing the relationships between the absolute value $|X|$ and the optimal coefficient A11, between the absolute value $|\dot{X}|$ and the optimal coefficient A12 and between the absolute value $|\ddot{Z}|$ and the optimal coefficient A13, respectively.

The principle of control of the second aspect of the present invention will be described with reference to FIG. 7 and FIGS. 8A to 8C. FIG. 7 shows a discrimination region of the vehicle travel state in the $|X|-|\dot{X}|-|\ddot{Z}|$ coordinate system in the same manner as in FIG. 5. The region P (i.e., the hatched region) in FIG. 7 is the same as the region P (FIG. 5) of the first aspect.

The present inventors performed a number of travel tests at different vehicle velocities and experimentally obtained optimal coefficients A11, A12, and A13 of the absolute values. Referring to FIGS. 8A to 8C, the optimal coefficients A11, A12 and A13 are nonlinear with respect to the absolute value $|X|$ of the relative displacement X between the axle and the body which is changed in accordance with the changes in road surface and travel states, the absolute value $|\dot{X}|$ of the rate $\dot{X}$ of change in relative displacement X, and the absolute value $|\ddot{Z}|$ of the absolute acceleration $\ddot{Z}$, respectively. Therefore, the coefficients for giving the reference values for changing the damping force characteristics of the hydropneumatic springs are changed in accordance with the absolute values $|X|$, $|\dot{X}|$ and $|\ddot{Z}|$ as the state change values, thereby sequentially obtaining the optimal damping forces, respectively.

The operation of the coefficient setting circuit will be described with reference to FIG. 7 and FIGS. 8A to 8C. Assume that a given travel state is given as point M (i.e., an $|X|-|\dot{X}|$ plane) within the hatched region P in FIG. 7. When point M is expressed and M' in an $|\dot{X}| - |\ddot{Z}|$ plane, point M has coordinates ($|X|m$, $|\dot{X}|m$, $|\ddot{Z}|m$). Referring to FIGS. 8A to 8C, a combination of optimal coefficients ($A11m$, $A12m$, $A13m$) is obtained.

Similarly, when point N is assumed in the region Q, its coordinates are given as ($|X|n$, $|\dot{X}|n$, $|\ddot{Z}|n$), and a combination of optimal coefficients ($A11n$, $A12n$ and $A13n$) can be obtained. As shown in FIG. 7, a region boundary line c (the broken line) and a region boundary line d (the solid line) can be obtained. These lines are represented by polygonal lines in FIG. 7 and can be expressed by equations (6) and (7) as follows:

Region boundary line c:

$$Y(c) = A11m|X| + A12m|\dot{X}| + A13m|\ddot{Z}| \quad (6)$$

Region boundary line d:

$$Y(d) = A11n|X| + A12n|\dot{X}| + A13n|\ddot{Z}| \quad (7)$$

When the reference values for evaluating motion of the vehicle are given as Cm and Cn, the state is determined by comparing Y(c) with Cm and Y(d) with Cn. The region boundary line c serves as a boundary line for switching the small damping force to the large damping force when the initial damping force in the region P is small. The region boundary line d serves as a boundary line for switching the large damping force to the small damping force when the initial damping force in the region Q is large. The former case indicates the mode wherein the vehicle rides over ups and downs or changes lanes to detour around an obstacle. The latter case indicates the mode wherein the vehicle rides over a bump.

When the control principle described above is used, the damping forces of the hydropneumatic springs can be sequentially changed to optimize the travel state of the vehicle in every travel state even if the vehicle rides over a transient step or a bump, thereby obtaining the optimal travel state of the vehicle.

The switching state of the damping force characteristics of the hydropneumatic springs is illustrated in FIG. 3. The state given by point M in FIG. 7 is recognized to fall within the region P in accordance with the average values $Y|X|$, $Y|\dot{X}|$ and $Y|\ddot{Z}|$ of equations (2) to (4) which satisfy condition (5). Therefore, a small damping force indicated by the curve op2 or op2' is given as shown in FIG. 3. When a larger signal is supplied to the restrictor, the restrictor is switching to obtain the damping force characteristic curve changing as indicated by the curve op2q2r or op2'q2'r (the solid curve) in FIG. 3.

When input conditions of the vehicle represent a larger force than that falling outside the boundary line given by equation (6), a larger damping force is produced to effectively absorb the vibrations.

The point N in FIG. 7 is recognized to fall within the region Q in accordance with condition (5), so that a large damping force is given as indicated by the curve oq2 or oq2' in FIG. 3. When a larger signal is supplied to the restrictor, the restrictor is controlled to change the damping force given as the curve oq1p1s or oq1'pi's' (the broken curve).

When input conditions of the vehicle represent a larger force than that falling outside the boundary line given by equation (7), the vibrations of the vehicle can be properly absorbed to prevent degradation of riding comfort.

As is apparent from the above description, in the active suspension apparatus of the second aspect, a combination of coefficients, for example, $(A11)ij, (A12)ij, (A13)ij$, which are derived from the absolute values of the absolute acceleration $\ddot{Z}$, the relative displacement X between the axle and the body and the rate $\dot{X}$ of change in relative displacement X are multiplied with these absolute values and the resultant products are added to each other, thereby obtaining a state evaluation value.

$$Yij = [(A11)ij, (A12)ij, (A13)ij] \begin{bmatrix} |X| \\ |\dot{X}| \\ |\ddot{Z}| \end{bmatrix} \quad (8)$$

When this state evaluation value is detected to fall within the specific region on a plane of the $|X| - |\dot{X}| - |\ddot{Z}|$ coordinate system which corresponds to the road surface and travel states, the controller discriminates whether or not the state evaluation value exceeds the reference value Cij for determining the region boundary line for each region. When the controller determines that the state evaluation value does not exceed the reference value Cij, the damping force is kept low. Otherwise, the damping force is increased. According to the second aspect, the damping force characteristics are controlled in accordance with the road surface and travel states. Therefore, when the vehicle travels at a high velocity or along a rough road, a large damping force is produced to effectively absorb the vibrations. However, when the vehicle travels at a low speed or along a smooth or normal road, a small damping force is produced to prevent degradation of riding comfort. In addition, when the vehicle travels along a very rough road whose roughness exceeds a predetermined level or rides over a bump, a large damping force may often not effectively absorb the vibration. In this case, a small damping force is produced to prevent the unsprung mass vibrations around the wheels from being transmitted to the vehicle body. Furthermore, when the vehicle travels on an up-and-down hill, detours around an obstacle, or changes lanes, a small damping force cannot effectively absorb the vibrations. In this case, a large damping force is produced to effectively absorb vibrations of the sprung mass, thereby providing optimal control.

According to the second aspect, therefore, the damping forces corresponding to the road surface state and the travel state are determined by factors such as a vehicle velocity, thereby improving riding comfort and steering stability.

An active suspension apparatus according to a first embodiment belonging to the first aspect will be described with reference to FIGS. 9 and 10.

The active suspension apparatus according to the first embodiment basically comprises an acceleration detecting means Ia1, a displacement detecting means Ib1, a controller II1, a driver III2 (not shown, but the same as the driver III of FIG. 4), a driving means IV1 and hydropneumatic suspensions V1 in the same manner as in FIG. 4.

Figure 9:
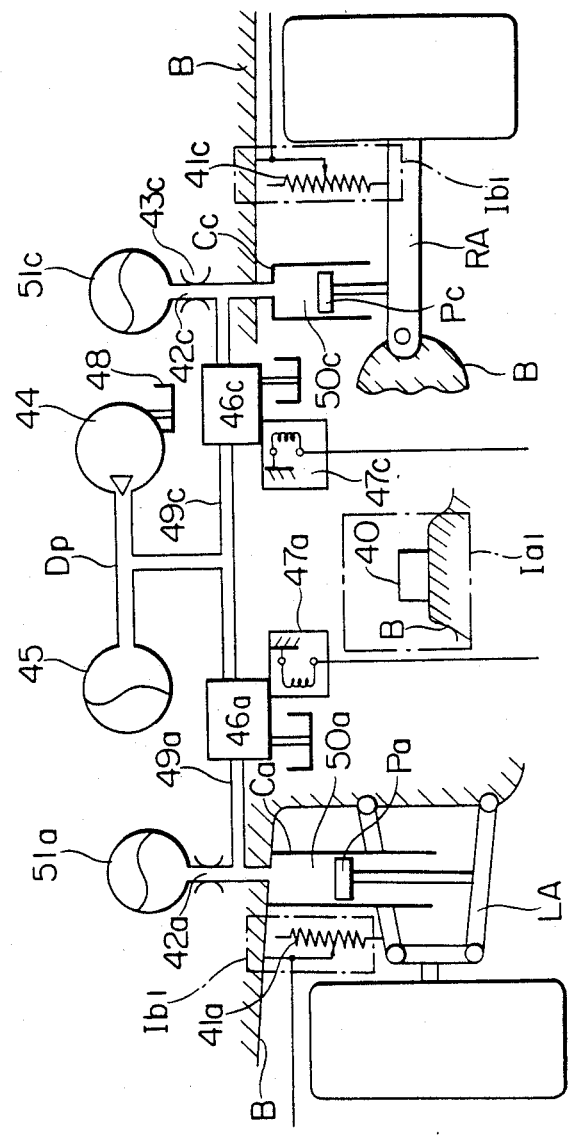
FIG. 9 is a diagram showing an active suspension apparatus according to a first embodiment of the present invention.

The acceleration detecting means Ia1 is mounted on a passenger's compartment floor B on which passengers ride, as shown in FIG. 9. The acceleration detecting means Ia1 comprises an acceleration meter 40 for detecting a vertical absolute acceleration $\ddot{Z}$ of the body during traveling. The displacement detecting means Ib1 comprises four linear potentiometers 41a, 41b, 41c and 41d which are arranged on links of the front and rear wheel suspension units to detect a displacement of an arm in accordance with a change in height upon vertical movement of a lower arm for supporting an axle or a trailing arm, thereby detecting the relative displacement X between the axle and the body during travel of the vehicle.

Figures 10, 10B:
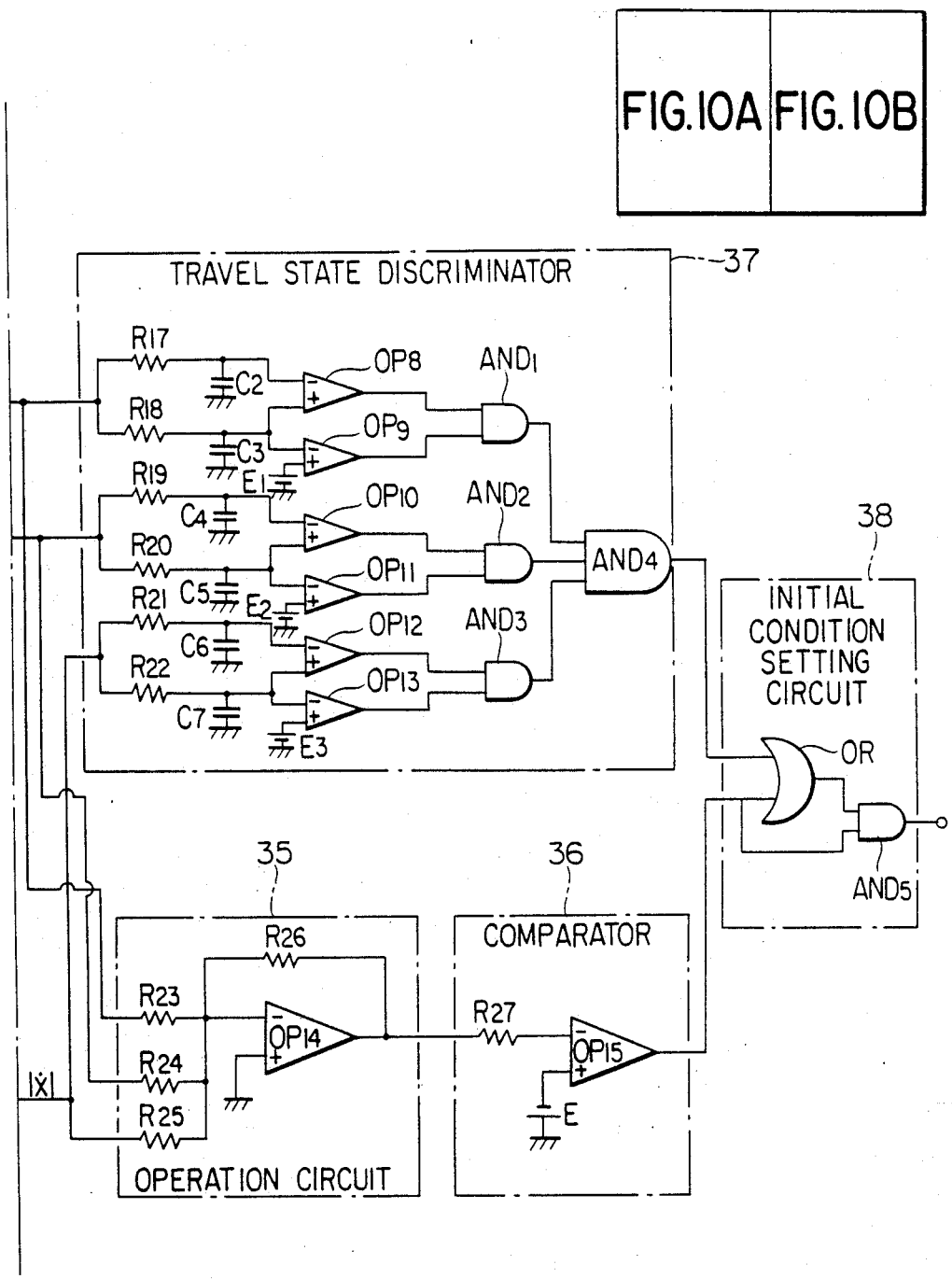
FIG. 10, composed of FIGS. 10A and 10B arranged as shown in FIG. 10, is a diagram showing an active suspension apparatus according to a second embodiment of the present invention.
Figure 10A:
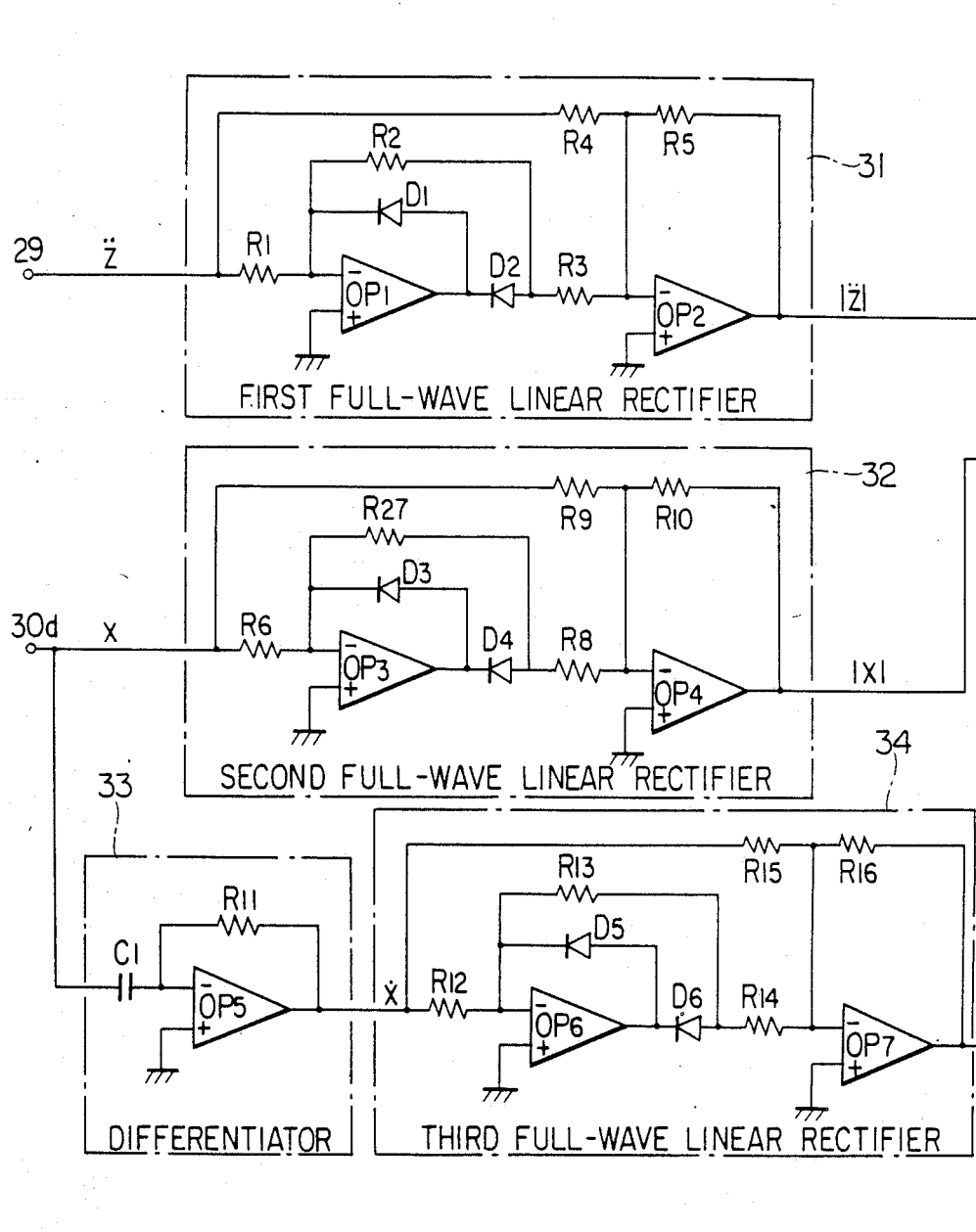

As shown in FIG. 10, the controller II1 comprises a first full-wave linear rectifier 31 connected to an acceleration meter 29 in the acceleration detecting means, a second full-wave linear rectifier 32 connected to the potentiometer 41c in the displacement detecting means, a differentiator 33 connected to the displacement detecting means Ib1, a third full-wave linear rectifier 34 connected to the differentiator 33, an operation circuit 35 connected to outputs of the rectifiers 31, 32 and 34, a comparator 36 for comparing an output from the operation circuit 35 with a reference value, a travel state discriminator 37 and a valve initial condition setting circuit 38.

The first full-wave linear rectifier 31 has the same arrangement as that of each of the second and third full-wave linear rectifiers 32 and 34. The rectifier 31 comprises a half-wave linear rectifier for inverting and amplifying only a positive cycle and an inverting amplifier. The half-wave linear rectifier comprises an operational amplifier OP1, resistors R1 and R2, and diodes D1 and D2. The inverting amplifier comprises an operational amplifier OP2 and resistors R3 to R5. The first full-wave linear rectifier 31 generates a signal (i.e., the absolute value signal $|\ddot{Z}|$) obtained by full-wave rectifying the absolute acceleration $\ddot{Z}$. Therefore, the rectifier 31 generates an absolute value signal irrespective of elongation/contraction of the hydropneumatic spring, and a positive acceleration or a negative acceleration (i.e., deceleration).

The differentiator 33 comprises a conventional differentiator of an operational amplifier OP5, a capacitor C1 and a resistor R11 and generates a signal $-\dot{X}$ obtained by differentiating and inverting the relative displacement.

The operation circuit 35 comprises resistors R23 to R26 and an operational amplifier OP14. The operation circuit 35 multiplies output signals $|\ddot{Z}|$, $|X|$ and $|\dot{X}|$ from the full-wave linear rectifiers 31, 32 and 34 with coefficients, inverts the products and adds the inverted products. The resistances of the resistors R23 to R25 are selected to provide the coefficients A11, A12 and A13 of equation (1). In other words, the input resistors R23, R24 and R25 are set at (1/A11)R26, (1/A12)R26, (1/A13)R26, respectively.

The comparator 36 comprises a resistor R27, an operational amplifier OP15 and a reference voltage source $-E$ and compares the output signal from the operation circuit 35 with the reference voltage. When the output signal is larger than the reference voltage, the comparator 36 generates a signal.

The travel state discriminator 37 in the controller II1 causes a CR integrator to integrate the signals from the full-wave linear rectifiers 31, 32 and 34 to obtain average values along the time base. The discriminator 37 then compares the average values with the reference values to generate a travel state discrimination signal. The discriminator 37 comprises resistors R17 to R22, capacitors C2 to C7, operational amplifiers OP8 to OP13, voltage sources E1 to E3 and AND gates AND1 to AND4. The discriminator 37 multiplies the output signals $|\ddot{Z}|$, $|X|$ and $|\dot{X}|$ from the full-wave linear rectifiers 31, 32 and 34 with filter coefficients having different frequencies, thereby discriminating the region for the given travel state. A CR integrator of a resistor R17 and a capacitor C2 is combined with a CR integrator of a resistor R18 and a capacitor C3 to vary the characteristics of the average values as a function of time. The voltage sources E1 to E3 are selected to provide reference values for the region P given by condition (5). The AND gates AND1 to AND4 generate region discrimination signals which represent the absolute acceleration, the relative displacement and the relative velocity, respectively. The output signals from the AND gates AND1 and AND4 are compared and discriminated by the AND gate AND4 as to whether or not all the output signals are larger than a reference signal.

The valve initial condition setting circuit 38 comprises an OR gate OR and an AND gate AND5 and receives the output signals from the comparator 36 and the travel state discriminator 37 to calculate the final valve control discrimination calculation.

A driver III1 (illustrated only in FIG. 4) is connected to the valve initial condition setting circuit 38 in the controller II1 to amplify the output from the valve initial condition setting circuit 38 so as to drive the driving means IV1.

The driving means IV1 comprises a restrictor switching electromagnetic valve for controlling a damping force generation restriction channel 42c in response to the signal from the driver III1. An electromagnetic valve 43c closes one of the paths in the channel 42c in response to the signal from the driver III1 and controls the opening of an orifice arranged in each path, thereby controlling the damping force. When the driver III1 does not generate an output signal, i.e., when a sum of a product of the absolute value $|\ddot{Z}|$ of the absolute acceleration and the corresponding coefficient, a product of the absolute value $|X|$ of the relative displacement and the corresponding coefficient and a product of the absolute value $|\dot{X}|$ of the rate $\dot{X}$ of change in relative displacement X does not exceed a predetermined reference value, i.e., when the vehicle travels along a smooth or normal road, the electromagnetic valve 43c controls the opening of the channel 42c, thereby decreasing the damping force of the hydropneumatic spring. However, when the driver III1 generates the output signal, the controller determines that the vehicle travels along a rough road, thereby increasing the damping force of the hydropneumatic spring.

The hydropneumatic suspensions V1 of the front and rear wheels comprise: a hydraulic generator 44; an accumulator 45; four flow control valves 46a, 46b, 46c and 46d; four valve controllers 47a, 47b, 47c and 47d for controlling the flow rates of the flow control valves 46a, 46b, 46c and 46d, respectively; a fluid reservoir 48 which receives unnecessary fluid and communicates with the intake port of the hydraulic generator 44; actuators 50a, 50b, 50c and 50d which communicate with the flow control valves 46a, 46b, 46c and 46d through pipes 49a, 49b, 49c and 49d, respectively; and four air springs 51a, 51b, 51c and 51d connected to the pipes 49a, 49b, 49c and 49d through restrictors 42a, 42b, 42c and 42d, respectively. In the construction shown in FIG. 9, only one front wheel suspension represented by a suffix a and one rear wheel suspension represented by a suffix c are exemplified.

The hydraulic generator 44 comprises a vane pump driven by the engine through a pulley to accumulate a working fluid of a predetermined pressure in the accumulator 45. The vane pump is driven upon rotation of the engine and generates a large torque at high engine speed or during braking.

The accumulator 45 comprises a metal vessel having a predetermined volume. The inner space of the accumulator 45 is partitioned by a rubber diaphragm into two compartments. A gas such as nitrogen gas at a predetermined pressure is sealed in one compartment, and the other compartment communicates with a delivery port of the vane pump through a pipe DP. The pumping capacity of the accumulator 45 prevents failure of the hydraulic generator 44 when its pumping capacity does not satisfy requirements of the hydraulic generator. In addition, the accumulator 45 allows the use of a small-capacity, compact vane pump.

Each of the flow control valves 46a, 46b, 46c and 46d comprises a spool valve which is axially moved in a cylinder with intake and delivery ports and which has a spool having a portion of an outer diameter different from that of the other parts thereof. The opening area of the restrictor is changed to control the delivery amount in accordance with the positional relationship between the large-diameter spool portion and the delivery port.

A nozzle flapper of each of the valve controllers 47a, 47b, 47c and 47d is operated in response to a current of an output signal from a signal processor, thereby generating a pressure difference. This difference acts on the two ends of the spool which is then moved. When the spool is moved, the nozzle flapper is moved to eliminate the difference since the nozzle flapper is mechanically coupled to the spool, thereby fixing the opening of the restrictor. The actuators 50a and 50b are inserted between the lower arms LA of the front wheel wishbone suspension units and a vehicle body B to lock pistons Pa and Pb at the lower arms LA. The cylinders Ca and Cb of the actuators 50a and 50b are locked by the body. The actuators 50c and 50d are inserted between the rear wheel axle RA and the body B. Pistons Pc and Pd of the actuators 50c and 50d are locked by the arms RA, and the cylinders Cc and Cd thereof are locked by the body B. The cylinders Ca, Cb, Cc and Cd of the actuators 50a, 50b, 50c and 50d are coupled to the delivery ports of the flow control valves 46a, 46b, 46c and 46d through the pipes 49a, 49b, 49c and 49d, respectively. The size of the front wheel actuators is larger than that of the rear wheel actuators. This is because the body is supported between the pivot pin of the lower arm and the wheel (i.e., in consideration of an arm ratio).

The air springs 51a, 51b, 51c and 51d comprise metal vessels each having a predetermined volume. Each vessel is partitioned by a rubber diaphragm into two compartments. A gas such as nitrogen gas at a predetermined pressure is sealed in one compartment, and the other compartment communicates with a corresponding one of the pipes 49a, 49b, 49c and 49d through a corresponding one of the restrictors 42a, 42b, 42c and 42d.

The operation of the active suspension apparatus having the structure described above will be described.

When the vehicle travels along a smooth or normal road, soft spring characteristics are used to generate a small damping force to guarantee good riding comfort. However, when the vehicle travels along a rough road, a large damping force of the hydropneumatic spring is generated to improve steering stability. The controller of the first embodiment determines that the vehicle travels along a smooth or a rough road in accordance with the average values of the absolute values $|X|$, $|\dot{X}|$ and $|\ddot{Z}|$ of the relative displacement X, its rate $\dot{X}$ of change and the absolute acceleration $\ddot{Z}$. A region which includes a current travel state is determined, and the initial value of the opening of the restrictor of the hydropneumatic spring is set, thereby optimizing the travel conditions.

When the vehicle abruptly rises over a bump or changes lanes while traveling along a smooth road, the absolute value $|\ddot{Z}|$ of the absolute acceleration, the absolute value $|\dot{X}|$ of the relative velocity $\dot{X}$ and the absolute value $|X|$ of the relative displacement are rapidly changed. In this case, the damping force characteristics of the hydropneumatic springs are switched.

According to the active suspension apparatus of the first embodiment, the damping forces of the hydropneumatic springs are optimally controlled while the vehicle travels in a steady state. When disturbance acts on the body, the damping forces of the hydropneumatic springs are changed to optimize riding comfort during traveling.

Furthermore, changes (e.g., pitching or rolling) in vehicle height which are caused by braking, acceleration and turning of the vehicle can be prevented, the vehicle height can be kept constant, driving stability can be achieved, and motion and riding comfort can be improved.

Furthermore, even if the wheels ride along ups and downs or over stones, the rubber diaphragms of the air springs 51 deform to absorb vibrations so as to damp their transmission to the body, thereby improving riding comfort.

Furthermore, since the actuators 50 are mounted at proper positions so as to achieve an optimal lever ratio, unlike the conventional suspension/damping apparatus having a metal spring and an absorber whose installation positions are high, resulting in narrow passenger's compartment space, the installation space of the apparatus of the first embodiment can be small, thereby assuring large passenger's compartment space, resulting in convenience.

An active suspension apparatus according to a second embodiment included in the second aspect of the present invention will be described with reference to FIG. 11 and subsequent drawings.

The active suspension apparatus of the second embodiment comprises an acceleration detecting means Ia2 for detecting an acceleration in the passenger's compartment, a displacement detecting means Ib2 for detecting a relative displacement between the axle and the body, a controller II2, a driver III2, a driving means IV2 and hydropneumatic suspensions V2.

The acceleration detecting means Ia2 comprises a strain gauge type acceleration meter 40 which is fixed on a passenger's compartment floor on which the passengers ride. The meter 40 detects the vertical absolute acceleration $\ddot{Z}$ in the compartment during travel of the vehicle and generates a voltage signal corresponding to the absolute acceleration Z.

The displacement detecting means Ib2 comprises four rotary potentiometers 41a, 41b, 41c and 41d for converting to a relative displacement a change in rotational angle about a fulcrum of a trailing arm or the lower arm for supporting an axle at the end of a link of each of the front and rear wheel suspensions. The displacement detecting means Ib2 thus detects the relative displacement X between the axle and the body during travel of the vehicle and generates a voltage signal corresponding to the relative displacement.

Figure 11B:
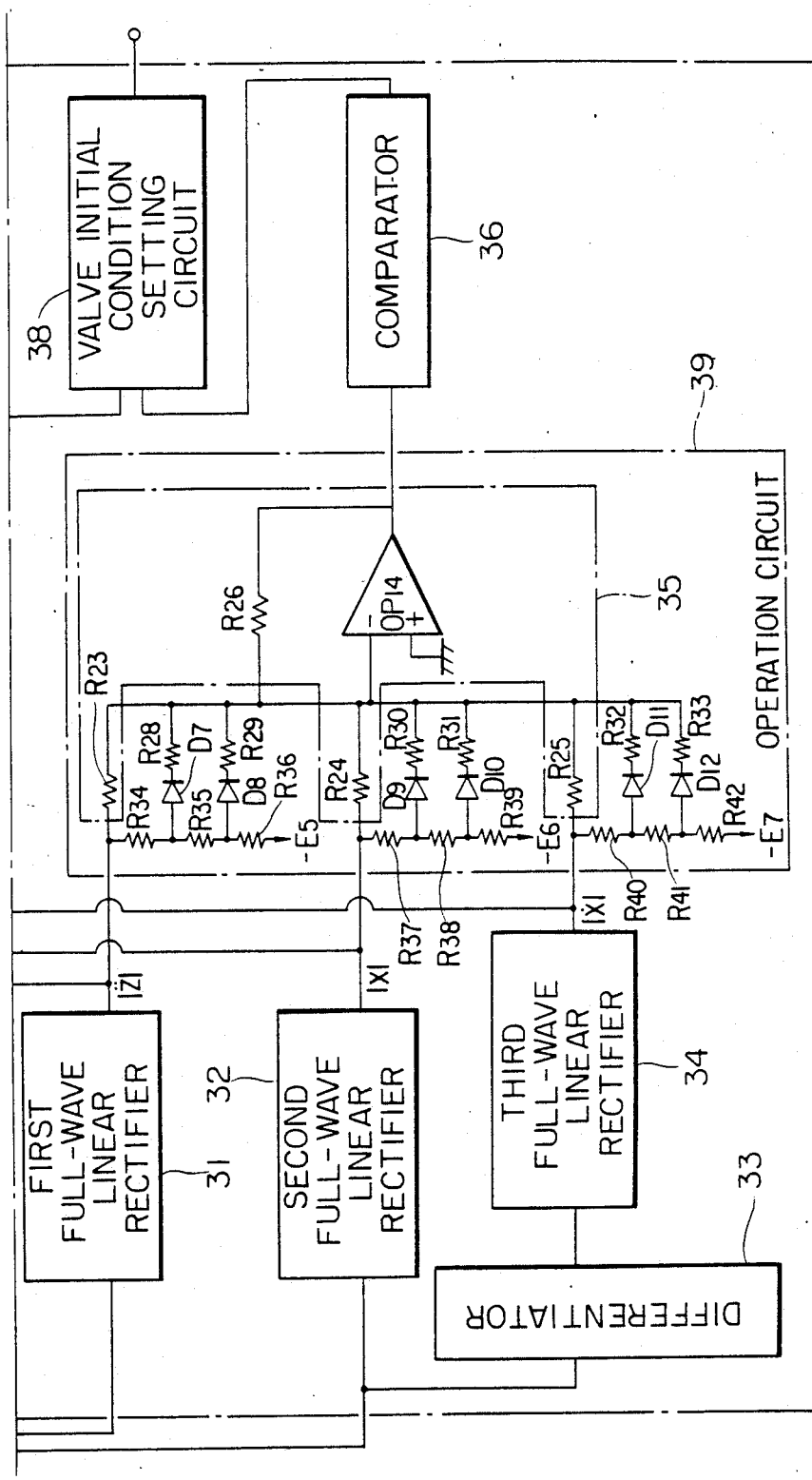
FIG. 11, composed of FIGS. 11A and 11B arranged as shown in FIG. 11, is a diagram showing the relationship between the suspension of the second embodiment and the controller.

As shown in FIG. 11 the controller II2 comprises: a first full-wave linear rectifier 31 connected to the acceleration meter 40 in the acceleration detecting means; a second full-wave linear rectifier 32 connected to a potentiometer 41b in the displacement detecting means; a differentiator 33 connected to the displacement detecting means; a third full-wave linear rectifier 34 connected to the differentiator 33; an operation circuit 35 connected to outputs of the rectifiers 31, 32 and 34; a comparator 36 for comparing the outputs from the operation circuit 35 with the reference value; a travel state discriminator 37; a valve initial condition setting circuit 38; and an operation circuit 39 obtained as a combination of the opening circuit 35 and a coefficient operation circuit. Therefore, the controller II2 of the second embodiment is substantially the same as that of the first embodiment except that the coefficient operation circuit is added to the operation circuit 35. The differences between the first and second embodiments will be mainly described. The same reference numerals in the second embodiment denote the same parts as in the first embodiment, and a detailed description thereof will be omitted.

The operation circuit 39 calculates the coefficients corresponding to the respective predicted nonlinear component signals from the full-wave linear rectifiers 31, 32 and 34 in the following manner. The calculated coefficients are multiplied with the output signals from the rectifiers 31, 32 and 34, and the resultant products are supplied from the operation circuit 35 to the comparator 36.

The output (i.e., the absolute value $|\ddot{Z}|$ of the absolute acceleration $\ddot{Z}$) from the full-wave linear rectifier 31 is exemplified. The nonlinear coefficient operation circuit comprises a polygonal line approximating circuit of resistors R28, R29, R34, R35 and R36, diodes D7 and D8 and a voltage source E5. Resistances of the resistors R23 and R27 are selected to change a slope of the first polygonal line in accordance with a resistance ratio thereof. Similarly, resistances of the resistors R26, R28 and R24 are selected to change a slope of the second polygonal line in accordance with a resistance ratio thereof, and resistances of the resistors R26, R29, R35 and R36 are selected to change a slope of the third polygonal line in accordance with a resistance ratio thereof. The outputs from the full-wave linear rectifiers 32 and 34 are processed by polygonal line approximation type nonlinear coefficient calculation circuits. The resistances of the resistors are selected to obtain slopes of the polygonal lines so as to approximate nonlinear correlations for providing the coefficients A11, A12 and A13 shown in FIG. 8, by using a combination of resistors R24, R26, R30, R31, R37, R38 and R39, diodes D9 and D10 and a voltage source E6, and a combination of resistors R25, R26, R32, R33, R40, R41 and R42, diodes D11 and D12 and a voltage source E7. The polygonal line approximation technique is not limited to the above-mentioned scheme, but can be extended by any multipoint approximation technique. By using combinations of resistors and diodes, an approximation technique using as many points as possible is preferred.

The other arrangements (e.g., the driver III2, the driving means IV2 and the hydropneumatic suspensions V2) excluding the operation circuit 39 in the controller II2 are the same as those of the first embodiment, and a detailed description thereof will be omitted.

According to the active suspension apparatus of the second embodiment, the damping force characteristics of the hydropneumatic springs are changed in accordance with the discrimination signal representing the road surface state and the travel state such as a vehicle velocity so as to correspond to changes in the travel state. Furthermore, according to the second embodiment, the change in travel state can be immediately detected by the travel state signal itself, and the restrictor opening of the hydropneumatic spring is changed so as to provide an optimal damping force for the current travel state. More particularly, according to the second embodiment, when the travel state of the vehicle is rapidly changed, the lane change mode (including cases wherein the vehicle travels over ups and downs or detours an obstacle) is distinguished from the bump riding mode. The reference value for the valve control conditions is sequentially changed to switch the hydropneumatic spring characteristics so as to satisfy a specific travel mode, thereby precisely changing the damping force. As a result, riding comfort of passengers can be optimized and at the same time steering stability can be guaranteed, resulting in convenience.

According to the second embodiment, since the displacement detecting means Ib2 comprises the rotary potentiometers 41, the suspension units can be made compact and the vehicle height can be decreased to provide a good outer appearance. In addition, the aerodynamic characteristics and fuel consumption performance can be improved.

The relative displacement (i.e., the state variable of the road surface on which the vehicle travels) between the axle and the body and the relative velocity (the state variable of the relative movement of the vehicle) as the rate of change in relative displacement as a function of time are detected and an acceleration in the passenger's compartment floor is also detected. The region for these variables is totally discriminated. More particularly, the controller detects first whether or not each variable belongs to a small region, and when the road surface state is changed, the damping force can be changed. In this suspension structure, the damping force characteristics are sequentially changed to optimize riding comfort during travel of the vehicle, and steering stability and running characteristics of the vehicle are improved.

In each embodiment described above, the acceleration detecting means comprises a strain gauge sensor. However, the acceleration detecting means may comprise a piezoelectric or electromagnetic sensor. The displacement detecting means Ib comprises the linear and rotary potentiometers in the first and second embodiments, respectively. However, a displacement sensor such as an electromagnetic sensor for detecting a relative displacement between the axle and the body as a change in magnetic flux or a telemeter may be used in place of the linear or rotary potentiometer.

In the above embodiments, the acceleration meter of the acceleration detecting means Ia is mounted on the vehicle floor. When the front wheel suspensions are to be controlled, the meter is mounted on the floor immediately under the front seat. However, in a vehicle such as an ambulance where rear seat area vibration is of primary concern, the meter may be mounted on the floor immediately under the rear seat.

The controller II of the present invention is not limited to the particular type described with reference to the preferred embodiments. Any type of controller can be used if it satisfies requirements wherein the absolute acceleration signal of the passenger's compartment and the relative displacement signal between the axle and the body can be differentiated, and the relative displacement signal and the signal representing its rate of change can be added to each other.

If high electrical power is required to control the flow control valves, amplifiers can be appropriately used. In addition, when a velocity sensor is used to obtain a rate of change in vehicle height, the differentiator can be omitted.

The operation circuits are not limited to the arrangements described in the above embodiments, but can be extended to an arrangement using an operation function of a microcomputer or the like.

The driver III, the driving means IV and the hydropneumatic suspensions V are not limited to the arrangements described with reference to the preferred embodiments. Any type of component can be used if the damping force characteristics are controlled in accordance with the absolute acceleration of the passenger's compartment, the relative displacement between the axle and the body, and the rate of change in relative displacement. Any component can be used to control the damping force characteristics for the electromagnetic forces and other forces, in addition to the pneumatic circuits, the hydraulic circuits, the air actuators and the hydraulic actuators which are described above.

The present invention is not limited to the particular embodiments described above. Various changes and modifications may be made without departing from the appended claims.

What is claimed is:

1. An active suspension apparatus using hydropneumatic springs for suspending a body of a vehicle on wheels by utilizing fluid and air pressures, comprising:
   acceleration detecting means, located at the floor of a passenger compartment, of a vehicle, for detecting an absolute acceleration $\ddot{Z}$ of said floor corresponding to a vertical acceleration of the floor;
   displacement detecting means for detecting a relative displacement X between an axle of the vehicle and the body;
   a controller having a differentiator for differentiating the relative displacement X detected by said displacement detecting means and generating a rate $\dot{X}$ of change in relative displacement as a function of time, an absolute value circuit for calculating absolute values of the absolute acceleration $\ddot{Z}$, the relative displacement X and the rate $\dot{X}$ of change in relative displacement X, an operation circuit for multiplying the absolute values $|\ddot{Z}|$, $|X|$ and $|\dot{X}|$ from said absolute value circuit with predetermined coefficients, respectively, and producing an output signal from the sum of the absolute values which have been multiplied by the coefficients, and a comparator for comparing an output signal from said operation circuit with a reference value and generating a signal representing the state of the road surface on which the vehicle travels and the travel state of the vehicle; and
   driving means for controlling an opening of a restrictor arranged between each hydropneumatic spring chamber and a corresponding actuator in accordance with the signal from said controller,
   whereby damping force characteristics are controlled in accordance with the road surface state and the travel state.

2. An apparatus according to claim 1, wherein said acceleration detecting means comprises a strain gauge acceleration sensor on said floor.

3. An apparatus according to claim 1, wherein said absolute value circuit comprises a full-wave linear rectifier.

4. An apparatus according to claim 1, wherein said displacement detecting means comprises a linear potentiometer, one end of which is fixed on an arm for supporting the axle of each of front and rear suspensions and a slider which is fixed on part of the vehicle body.

5. An apparatus according to claim 1, wherein said displacement detecting means comprises a rotary potentiometer.

6. An apparatus according to claim 1, wherein said controller further comprises:
   an average value circuit for calculating average values $Y|X|$, $Y|\dot{X}|$ and $Y|\ddot{Z}|$ of the absolute value $|X|$ of the relative displacement, the absolute value $|\dot{X}|$ of the rate $\dot{X}$ of change in relative displacement and the absolute value $|\ddot{Z}|$ of the absolute acceleration $\ddot{Z}$ within a predetermined period of time;
   a comparator for comparing the average values from said average value circuit with corresponding reference values and generating a comparison signal;
   a discriminator for generating an output signal when all the average values are larger or smaller than the corresponding reference values; and
   an initial condition setting circuit for setting an initial opening of said restrictor in response to the output signal from said discriminator.

7. An apparatus according to claim 1, wherein said operation circuit in said controller comprises coefficient setting circuits for nonlinearly changing the coefficients in accordance with magnitudes of the outputs from said absolute value circuit, the coefficients being multiplied with the outputs from said absolute value circuit.

8. An apparatus according to claim 7, wherein each of said coefficient setting circuits comprises a polygonal line approximating circuit of a plurality of resistors and a plurality of diodes.

9. An apparatus according to claim 1, wherein said driving means comprises an electromagnetic selector valve arranged in one of two paths in a channel of said restrictor so as to open/close said one path.

* * * * *